US012732737B2

(12) United States Patent
Zhang et al.

(10) Patent No.: US 12,732,737 B2
(45) Date of Patent: Sep. 8, 2026

(54) CORE MODULES AND ELECTRONIC DEVICES

(71) Applicants: SHENZHEN SHOKZ CO., LTD., Shenzhen (CN); KING TONE INNOVATION (BEIJING) TECHNOLOGY CO. LTD., Beijing (CN)

(72) Inventors: Lei Zhang, Shenzhen (CN); Peigeng Tong, Shenzhen (CN); Guolin Xie, Shenzhen (CN); Shanyong Gu, Beijing (CN); Hongqiang Zhao, Beijing (CN); Xin Qi, Shenzhen (CN)

(73) Assignees: SHENZHEN SHOKZ CO., LTD., Shenzhen (CN); KING TONE INNOVATION (BEIJING) TECHNOLOGY CO. LTD., Beijing (CN)

( * ) Notice: Subject to any disclaimer, the term of this patent is extended or adjusted under 35 U.S.C. 154(b) by 139 days.

(21) Appl. No.: 18/900,871

(22) Filed: Sep. 29, 2024

(65) Prior Publication Data

US 2025/0024188 A1 Jan. 16, 2025

Related U.S. Application Data

(63) Continuation of application No. PCT/CN2022/143896, filed on Dec. 30, 2022.

(51) Int. Cl.
*H04R 1/10* (2026.01)

(52) U.S. Cl.
CPC ......... *H04R 1/1058* (2013.01); *H04R 1/1016* (2013.01)

(58) Field of Classification Search
CPC ............................ H04R 1/1058; H04R 1/1016
(Continued)

(56) References Cited

U.S. PATENT DOCUMENTS 5,838,809 A * 11/1998 Sato ......................... H04R 1/06 381/409
9,749,726 B2 * 8/2017 Lee ........................ H04R 1/025
(Continued)

FOREIGN PATENT DOCUMENTS

CN 203722813 U 7/2014
CN 204442669 U 7/2015
(Continued)

OTHER PUBLICATIONS

The Extended European Search Report in European Application No. 22969766.9 mailed on Apr. 17, 2025, 8 pages.
(Continued)

*Primary Examiner* — Joseph Saunders, Jr.
(74) *Attorney, Agent, or Firm* — METIS IP LLC

(57) ABSTRACT

Provided are a core module and an electronic device. The core module may include a core housing, a speaker, and a bracket. The bracket and the speaker may form an acoustic cavity, the core housing may include an acoustic hole, the bracket may include an acoustic channel, and the speaker may include first accommodation space in flow communication with the acoustic cavity. The speaker, the bracket, and the core housing may form second accommodation space that is outside the speaker and isolated from the acoustic cavity. The speaker may include a coil, a frame, and two metal members disposed on the frame. Each of the two metal members may include a first pad, a second pad, and a transition portion. The first pad and the second pad may be exposed from the frame, the first pad may be located within the first accommodation space and connected to the coil.

20 Claims, 25 Drawing Sheets

B1-B1

(58) Field of Classification Search
USPC .................................................. 381/384, 394
See application file for complete search history.

(56) References Cited

U.S. PATENT DOCUMENTS

| | | | | |
|---|---|---|---|---|
| 2005/0105756 | A1* | 5/2005 | Kobayashi ............... | H04R 1/06 381/189 |
| 2017/0034629 | A1 | 2/2017 | Mao et al. | |
| 2021/0168482 | A1 | 6/2021 | Wang et al. | |
| 2021/0168489 | A1 | 6/2021 | Zhang et al. | |
| 2021/0329376 | A1 | 10/2021 | Li et al. | |
| 2024/0089650 | A1* | 3/2024 | Wang ................... | H04R 1/1041 |

FOREIGN PATENT DOCUMENTS

| | | | |
|---|---|---|---|
| CN | 208158868 | U | 11/2018 |
| CN | 209267805 | U | 8/2019 |
| CN | 209358728 | U | 9/2019 |
| CN | 210202084 | U | 3/2020 |
| CN | 214154832 | U | 9/2021 |
| CN | 215647335 | U | 1/2022 |

OTHER PUBLICATIONS

International Search Report in PCT/CN2022/143896 mailed on Apr. 17, 2023, 7 pages.
Written Opinion in PCT/CN2022/143896 mailed on Apr. 17, 2023, 6 pages.

* cited by examiner

CORE MODULES AND ELECTRONIC DEVICES

CROSS-REFERENCE TO RELATED APPLICATIONS

This application is a Continuation of International Patent Application No. PCT/CN2022/143896, filed on Dec. 30, 2022, the entire contents of which are incorporated herein by reference.

TECHNICAL FIELD

The present disclosure relates to the field of electronic devices, and in particular relates to core modules and electronic devices.

BACKGROUND

With the continuous popularization of electronic devices, electronic devices have become indispensable social and entertainment tools in people's daily lives. Electronic devices such as headphones and smart glasses have also been widely used in people's daily lives. The electronic devices may be used in conjunction with cell phones, computers, and other terminal devices to provide an auditory feast for users.

SUMMARY

Some embodiments of the present disclosure provide a core module. The core module may include a core housing, and a speaker and a bracket disposed within the core housing, wherein the bracket and the speaker collectively form an acoustic cavity, the core housing includes an acoustic hole, the bracket includes an acoustic channel, the acoustic hole being in flow communication with the acoustic cavity through the acoustic channel, and the speaker includes first accommodation space in flow communication with the acoustic cavity. The speaker, the bracket, and the core housing may form second accommodation space that is outside the speaker and isolated from the acoustic cavity. The speaker may include a coil, a frame, and two metal members disposed on the frame, wherein one of the two metal members is configured as a positive terminal of the speaker, and the other one of the two metal members is configured as a negative terminal of the speaker, and each of the two metal members includes a first pad, a second pad, and a transition portion connecting the first pad and the second pad. The first pad and the second pad may be exposed from the frame, the first pad may be located within the first accommodation space and is connected to the coil, the second pad may be located within the second accommodation space, and a distance between the first pads of the two metal members may be greater than a distance between the second pads of the two metal members.

In some embodiments, the transition portion may be embedded within the frame, or the transition portion may be sealed on the frame in a waterproof manner.

In some embodiments, the second pads of the two metal members may be arranged side by side and spaced apart. One end of each transition portion may be connected to a corresponding second pad, the two transition portions may respectively extend in directions away from each other, and each first pad may be connected to the other end of the corresponding transition portion.

In some embodiments, the speaker may include a magnetic cover and a magnet disposed within the magnetic cover, the magnet and the magnetic cover may form a magnetic gap, and the coil may extend into the magnetic gap. The frame may include an annular peripheral wall, an annular flange connected to an inner wall surface of the annular peripheral wall, and one or more bosses disposed at a junction of the annular flange and the annular peripheral wall. The magnetic cover may be fixed on the annular flange, the one or more bosses may support the two metal members, and the second pads may be exposed from the one or more bosses.

In some embodiments, the one or more bosses may include two bosses spaced apart along a circumferential direction of the annular peripheral wall, and each of the two bosses may be configured to support one of the two metal members.

In some embodiments, the frame may have a long axis direction and a short axis direction that are perpendicular to a vibration direction of the speaker and orthogonal to each other. A dimension of the frame in the long axis direction may be greater than a dimension of the frame in the short axis direction, and the two metal members may be located at a same end of the long axis direction.

In some embodiments, the bracket and the core housing may cooperate to form a first adhesive reservoir groove surrounding at least a portion of the acoustic hole, and the first adhesive reservoir groove may contain a first adhesive for sealing an assembly gap between the bracket and the core housing.

In some embodiments, the frame may include a first annular platform and a second annular platform arranged in a stepped shape, the second annular platform may surround a periphery of the first annular platform. A portion of a lower end of the bracket may be supported by the first annular platform, and another portion of the lower end of the bracket may form a gap region with the second annular platform, so that the bracket, the frame, and the core housing may form a second adhesive reservoir groove. The second adhesive reservoir groove may contain a second adhesive for sealing an assembly gap between any two of the bracket, the frame, and the core housing.

In some embodiments, the bracket may include an annular main body portion and a docking portion connected to the annular main body portion, and the annular main body portion may be sleeved on a periphery of the speaker to form the acoustic cavity. The acoustic channel may penetrate through the docking portion and the annular main body portion, the docking portion may be located between the annular main body portion and the core housing and surround at least a portion of the acoustic hole, and the docking portion may cooperate with the core housing to form the first adhesive reservoir groove.

In some embodiments, the docking portion may be configured to form a bottom wall and one side wall of the first adhesive reservoir groove, and the core housing may form another side wall of the first adhesive reservoir groove.

In some embodiments, an inner side of the core housing may include a recessed region, and the acoustic hole may be located at a bottom of the recessed region. The core module may further comprise an acoustic resistance mesh disposed within the recessed region, and the docking portion may press the acoustic resistance mesh against the bottom of the recessed region.

In some embodiments, the first adhesive may be further configured to seal an assembly gap between the bracket and the acoustic resistance mesh and/or an assembly gap between the acoustic resistance mesh and the core housing.

Some embodiments of the present disclosure provide an electronic device. The electronic device may comprise a support component and the core module described above. The support component may be connected to the core housing to support the core module and place the core module at a wearing position.

The present disclosure may at least have the following beneficial effects. Compared with the prior art, the core module provided in the present disclosure has the first accommodation space connected to the acoustic cavity and the second accommodation space not connected to the acoustic cavity. Although the first pads are provided in the first accommodation space with a relatively low waterproof grade, the distance between the first pads of the two metal members is relatively large, making it less likely for liquid droplets such as sweat and rainwater intruding through the acoustic hole and the acoustic channel into the first accommodation space to cause short connections between the first pads of the two metal members, thus avoiding burning out the core module. Because the second pads are set in the second accommodation space with a relatively high waterproof grade, even if the distance between the second pads of the two metal members is relatively small, it does not lead to short connections, thus avoiding the core module being burned. In addition, due to the relatively small distance between the second pads of the two metal members, the wires or flexible circuit boards connecting the two metal members to other electronic components can be shortened, thereby simplifying a wiring structure of the speaker and reducing costs.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

The present disclosure is described in further detail below in conjunction with the accompanying drawings and embodiments. In particular, it should be noted that the following embodiments are only used to illustrate the present disclosure, but do not limit the scope of the present disclosure. Similarly, the following embodiments are only some but not all embodiments of the present disclosure, and all other embodiments obtained by a person of ordinary skill in the art without creative labor fall within the scope of protection of the present disclosure.

References to "embodiments" in the present disclosure mean that particular features, structures, or characteristics described in conjunction with embodiments may be included in at least one embodiment of the present disclosure. It may be understood by those of skill in the art, both explicitly and implicitly, that the embodiments described in the present disclosure may be combined with other embodiments.

Figure 1:
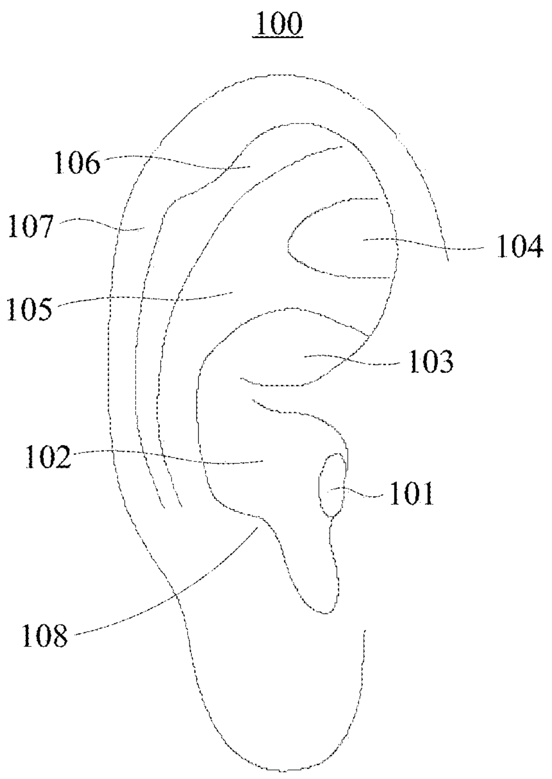
FIG. 1 is a schematic diagram of a profile of a front side of an ear of a user according to some embodiments of the present disclosure.

Referring to FIG. 1, an ear 100 of a user may include physiological parts such as an external ear canal 101, a cavum conchae 102, a cymba conchae 103, a triangular fossa 104, an antihelix 105, a scaphoid fossa 106, a helix 107, and an antitragus 108. Although the external ear canal 101 has a certain depth and extends to a tympanic membrane of the ear, for ease of description and referring to FIG. 1, the present disclosure defines the external ear canal 101 as an entrance (i.e., an ear hole) of the ear that is dorsal to the tympanic membrane, unless otherwise specified. Furthermore, physiological parts such as the cavum conchae 102, the cymba conchae 103, the triangular fossa 104, or the like, have a certain volume and a certain depth, and the cavum conchae 102 is in direct communication with the external ear canal 101, which means that the ear hole may be regarded as being located at a bottom of the cavum conchae 102.

Furthermore, different users may have individual differences, resulting in different shapes, sizes, and other dimensional differences of the ear. For ease of description and to minimize (or even eliminate) individual differences between different users, a simulator (e.g. GRAS 45BC KEMAR) with a head and (left and right) ears may be produced based on the ANSI: S3.36, S3.25 and IEC: 60318-7 standards. Thus, in the present disclosure, expressions such as "the user wears the earphone," "the earphone is in a wearing state," "in the wearing state," etc., refer to the earphone described in the present disclosure being worn on the ears of the aforementioned simulator. Of course, precisely due to individual differences between users, when the earphone is worn by different users, there may be some variation compared to when the earphone is worn on the ears of the aforementioned simulator. However, such differences should be tolerated.

It should be noted that in the fields of medicine, anatomy, or the like, three basic planes of the human body, including a sagittal plane, a coronal plane, and a horizontal plane, and three basic axes, including a sagittal axis, a coronal axis, and a vertical axis, may be defined. The sagittal plane refers to a plane perpendicular to a ground and runs along a front-to-rear direction of the body, which divides the body into a left part and a right part; the coronal plane refers to a plane perpendicular to the ground and runs along a left-to-right direction of the body, which divides the body into an anterior part and a posterior part; and the horizontal plane refers to a plane parallel to the ground and runs along a top-to-bottom direction of the body, which divides the body into an upper part and a lower part. Correspondingly, the sagittal axis is an axis along the front-to-rear direction of the body and perpendicular to the coronal plane, the coronal axis is an axis along the left-to-right direction of the body and perpendicular to the sagittal plane, and the vertical axis is an axis along the top-to-bottom direction of the body and perpendicular to the horizontal plane. Furthermore, the "front side of the ear" described in the present disclosure is a concept relative to the "rear side of the ear," where the former refers to a side of the ear that is away from the head, and the latter refers to a side of the ear that is toward the head, both of which are directed to the ear of the user. Observing the ear of the above-described simulator along a direction in which the coronal axis of the human body is located, a schematic diagram of the profile of the front side of the ear as shown in FIG. 1 may be obtained.

Figure 2:
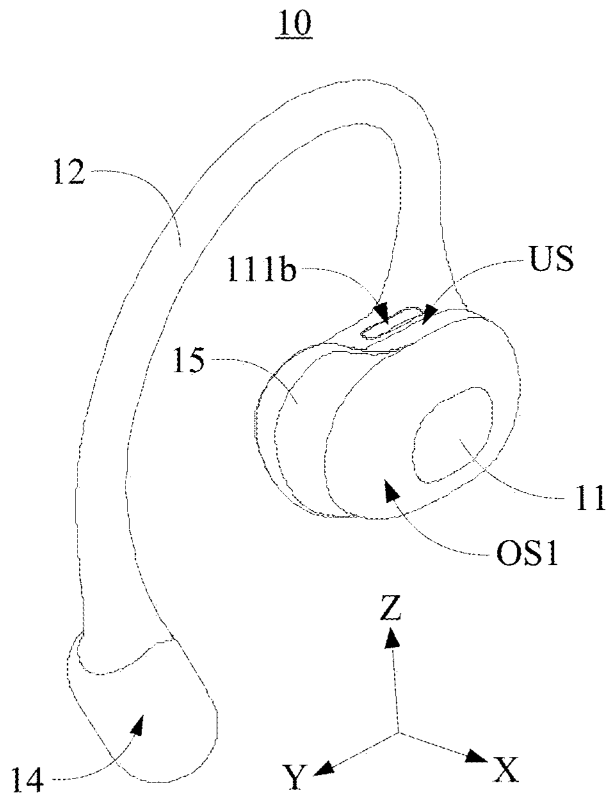
FIG. 2 is a schematic diagram of an exemplary structure of an earphone according to some embodiments of the present disclosure.
Figure 3:
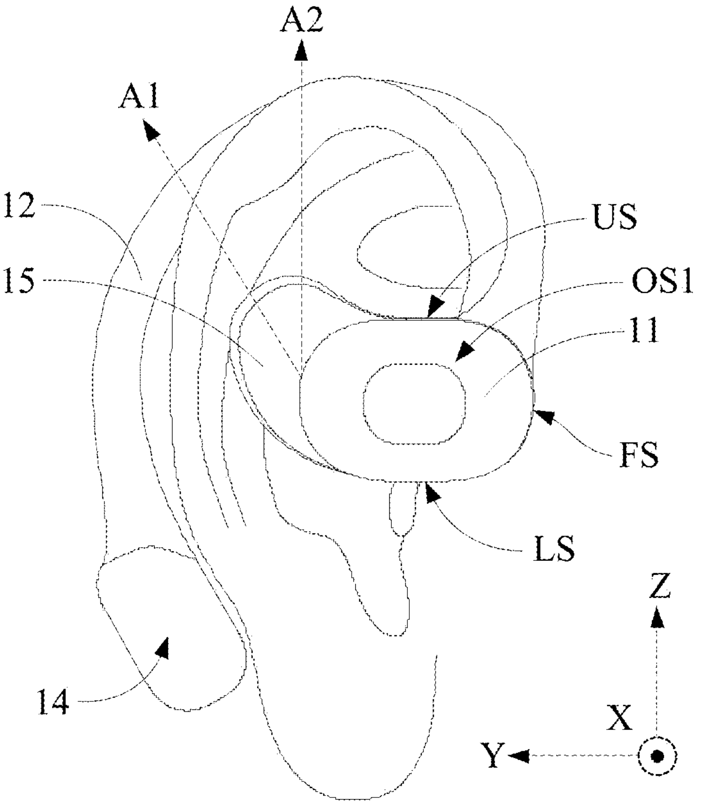
FIG. 3 is a schematic diagram of the earphone in FIG. 2 in a wearing state according to some embodiments of the present disclosure.

By way of example, referring to FIG. 2 and FIG. 3, an earphone 10 may include a core module 11 and a hook-like structure 12 connected to the core module 11. The core module 11 may be disposed on a front side of an ear of a user in a wearing state, and at least part of the hook-like structure 12 may be disposed on a rear side of the ear in the wearing state to enable the earphone 10 to be disposed on the ear in the wearing state. The core module 11 may be configured not to block an external ear canal in the wearing state, making the earphone 10 as an "open earphone." It should be noted that, due to individual differences between different users, when the earphone 10 is worn by different users, the core module 11 may partially cover the external ear canal, but the external ear canal remains unblocked.

In order to improve stability of the earphone 10 in the wearing state, the earphone 10 may be configured in any one of the following ways or a combination thereof. Firstly, at least a portion of the hook-like structure 12 may be configured as a mimetic structure that fits with at least one of the rear side of the ear and/or the head to increase a contact area of the hook-like structure 12 with the ear and/or the head so as to increase a resistance of the earphone 10 from falling off the ear. Secondly, at least a portion of the hook-like structure 12 may be configured as an elastic structure to enable the hook-like structure 12 to have a certain amount of deformation in the wearing state, so as to increase a positive pressure of the hook-like structure 12 on the ear and/or the head, thereby increasing the resistance of the earphone 10 from falling off the ear. Third, at least a portion of the hook-like structure 12 may be configured to abut against the head in the wearing state, so as to form a reaction force that presses against the ear, thereby causing the core module 11 to press against the front side of the ear, and increasing the resistance of the earphone 10 from falling off the ear. Fourth, the core module 11 and the hook-like structure 12 may be configured to hold a physiological part such as a region where the antihelix is located, a region where the cavum conchae is located, or the like, from the front side and the rear side of the ear in the wearing state, thereby increasing the resistance of the earphone 10 from falling off the ear. Fifth, the core module 11 or an auxiliary structure connected thereto may be configured to at least partially extend into a physiological part such as the cavum conchae, the cymba conchae, the triangular fossa, and the scaphoid fossa, so as to increase the resistance of the earphone 10 from falling off the ear.

Merely by way of example, referring to FIGS. 1 to 3, the earphone 10 may include an auxiliary structure 15 connected to the core module 11. At least a portion of the auxiliary structure 15 may be located on the front side of the ear in the wearing state, i.e., the at least a portion of the auxiliary structure 15 may be located on a same side of the ear as the core module 11 in the wearing state to assist the core module 11 in the wearing state. In the wearing state, the core module 11 may be pressed against a first ear region corresponding to the cymba conchae, and the auxiliary structure 15 may be pressed against a second ear region corresponding to the antihelix, i.e., the core module 11 and the auxiliary structure 15 may be pressed against different regions on the ear. Compared to a configuration in which the earphone 10 that is only provided with the core module 11, the configuration in which the earphone 10 is further provided with the auxiliary structure 15 that cooperates with the core module 11 not only increases a contact area between the earphone 10 and the front side of the ear but also avoids a contact force between the earphone 10 and the front side of the ear from being concentrated in a small region, which is conducive to improving the stability and comfort of the earphone 10 in the wearing state. In addition, when viewed along a thickness direction X of the core module 11, a distance between the auxiliary structure 15 and the hook-like structure 12 is less than at distance between the core module 11 and the hook-like structure 12, so that a shear force generated by a clamping force of the earphone 10 on the ear may be weakened, or even transformed into a compression force, which is conducive to improving the stability and comfort of the earphone 10 in the wearing state. The thickness direction X may be defined as a direction in which the core module 11 is near or far from the ear in the wearing state.

Further, the auxiliary structure 15 may be detachably connected to the core module 11 by any of a snap fastener, a double-sided adhesive, threads, or the like. A plurality of auxiliary structures 15 of the same or different specifications may be prepared for the earphone 10 for ease of change or use by different users.

By way of example, referring to FIG. 3, in the wearing state and viewed along the thickness direction X, an extension direction (e.g., represented by the dashed arrow A1 in FIG. 3) of the auxiliary structure 15 points toward a back of the head and is at an acute angle with a positive direction (e.g., represented by the dashed arrow A2 in FIG. 3) of the vertical axis of the human body pointing toward a top of the head. This configuration not only allows the auxiliary structure 15 to be conveniently pressed against an ear region corresponding to the antihelix 105, but also the auxiliary structure 15 can be pressed against a middle region with a relatively large area on the antihelix 105, which is conducive to improving the stability and comfort of the earphone 10 in the wearing state.

By way of example, referring to FIG. 2 to FIG. 6, the core module 11 may have a first inner side IS1 facing the ear along the thickness direction X in the wearing state, a first outer side OS1 facing away from the ear in the wearing state, and a connecting surface connecting the first inner side IS1 and the first outer side OS1. The auxiliary structure 15 may be connected at least to the aforementioned connecting surface. For example, the auxiliary structure 15 may be connected only to the aforementioned connecting surface. As another example, the auxiliary structure 15 may be connected not only to the aforementioned connecting surface but also connected to the first outer side OS1. Through this configuration, the distance between the auxiliary structure 15 and the hook-like structure 12 in the thickness direction X may be maintained within a reasonable range, thereby preventing an excessively large compression force of the auxiliary structure 15 resulting from the aforementioned distance being too small, and preventing an excessively small compression force of the auxiliary structure 15 resulting from the aforementioned distance being too large.

It should be noted that, when viewed along the thickness direction X, the core module 11 may be configured as a shape such as a circle, an oval, a rounded square, a rounded rectangle, or the like. If the core module 11 is configured as a circle, an ellipse, or the like, the aforementioned connecting surface may be referred to as a curved side of the core module 11. If the core module 11 is configured as a rounded square, a rounded rectangle, or the like, the aforementioned connecting surface may include a lower side LS, an upper side US, a front side FS, and a rear side RS, which will be described later. Further, the core module 11 may have a length direction Y and a width direction Z that are orthogonal to each other and perpendicular to the thickness direction X. The length direction Y may be defined as a direction in which the core module 11 is close to or away from the back of the head of the user in the wearing state, and the width direction Z may be defined as a direction in which the core module 11 is close to or away from the top of the head of the user in the wearing state. Thus, for ease of description, the present disclosure is illustrated exemplarily with the core module 11 configured as a rounded rectangle. A length of the core module 11 in the length direction Y may be greater than a width of the core module 11 in the width direction Z. Therefore, the above-described connecting surface may include the upper side US away from the external ear canal and the lower side LS facing toward the external ear canal along the width direction Z in the wearing state, and the rear side RS facing toward the back of the head and the front side FS away from the back of the head along the length direction Y in the wearing state. The auxiliary structure 15 may be at least connected to the rear side RS. For example, the auxiliary structure 15 may be connected to the rear side RS only. As another example, the auxiliary structure 15 may be connected to the rear side RS and also connected to the upper side US. Through this configuration, the auxiliary structure 15 may be pressed against the middle region with a relatively large area on the antihelix 105.

Furthermore, a thickness of the auxiliary structure 15 may be smaller than a dimension of the core module 11 in the thickness direction X, so as to take into account a weight and a size of the earphone 10. When viewed along the length direction Y or the width direction Z, a position where the auxiliary structure 15 is connected to the core module 11 may be located at a position between one-third of the thickness of the core module 11 and two-thirds of the thickness of the core module 11 in the thickness direction X. For example, the position where the auxiliary structure 15 is connected to the core module 11 may be located at one-half of the thickness of the core module 11 in the thickness direction X. Through this configuration, a distance between the auxiliary structure 15 and the hook-like structure 12 in the thickness direction X may be maintained within a reasonable range, thereby preventing an excessively large compression force of the auxiliary structure 15 resulting from the aforementioned distance being too small, and preventing an excessively small compression force of the auxiliary structure 15 resulting from the aforementioned distance being too large.

By way of example, referring to FIG. 5-FIG. 6 and FIG. 9-FIG. 10, the hook-like structure 12 and the auxiliary structure 15 are staggered in the thickness direction X. Through this configuration, the earphone 10 may better adapt to a thickness of the ear, which not only helps to prevent an excessive compression force of the auxiliary structure 15 on the antihelix that may cause discomfort, but also helps to prevent the auxiliary structure 15 from pushing up the core module 11, which may lead to instability during wearing.

Figure 7:
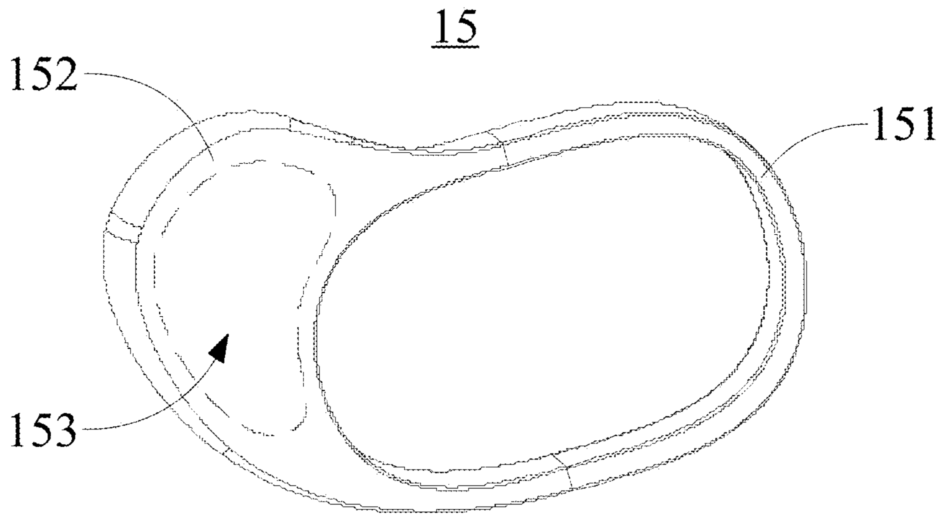
FIG. 7 is a schematic diagram of an exemplary structure of an auxiliary structure according to some embodiments of the present disclosure.

By way of example, referring to FIG. 7, the auxiliary structure 15 may include a connecting portion 151 connected to the core module 11 and an extension portion 152 connected to the connecting portion 151, and the auxiliary structure 15 may be in contact with the the antihelix 105 via the extension portion 152. A hardness of the extension portion 152 may be smaller than a hardness of the core module 11. For example, a material of the extension portion 152 may include a plastic, a rubber, or the like. Through this configuration, the extension portion 152 may undergo different amounts of elastic deformation when the earphone 10 is worn by different users, thereby making the auxiliary structure 15 to excerpt an appropriate compression force on the antihelix 105. Of course, a hardness of the connecting portion 151 may also be smaller than the hardness of the core module 11. Specifically, the hardness of the connecting portion 151 may be smaller than a hardness of a core housing 111 described below. For example, the connecting portion 151 may be made of a same material as the extension portion 152. Correspondingly, the connecting portion 151 may be configured to be detachably connected or non-detachably connected to the core module 11 according to demand.

Further, the auxiliary structure 15 may include a flexible embedding block 153 connected to the extension portion 152, and the flexible embedding block 153 may be disposed within the extension portion 152 or on a side of the extension portion 152 facing toward the antihelix 105. A hardness of the flexible embedding block 153 may be smaller than the hardness of the extension portion 152 to make the portion of the auxiliary structure 15 in contact with the antihelix 105 softer, which is conducive to improving the stability and comfort of the earphone 10 in the wearing state.

Figure 5:
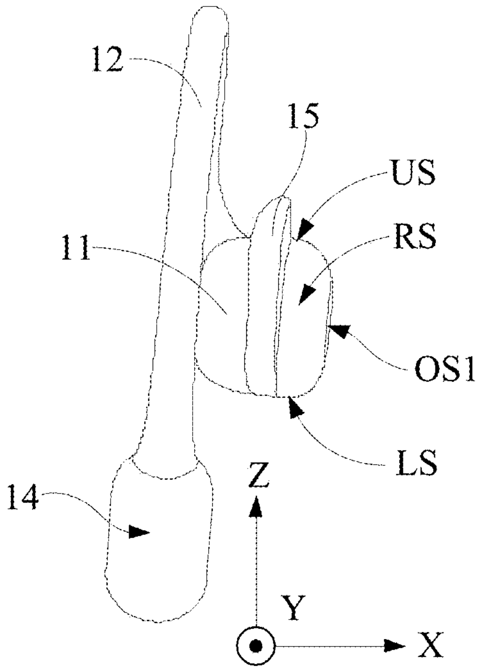
FIG. 5 is a schematic diagram of an exemplary structure of the earphone in FIG. 2 observed from another view.
Figure 6:
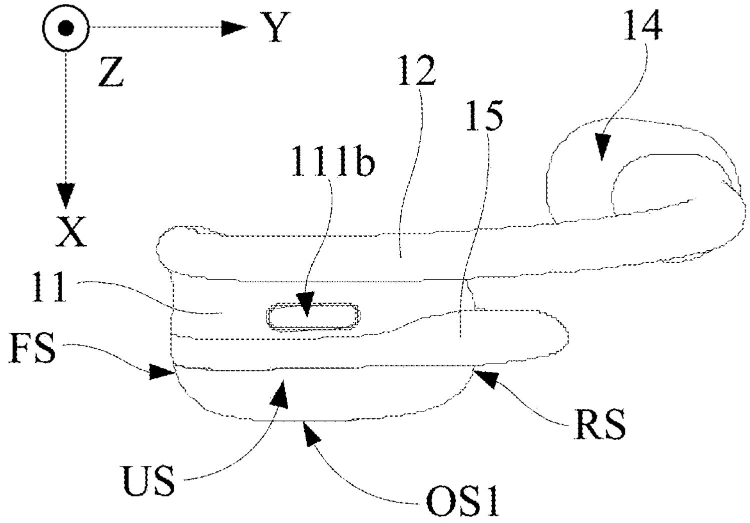
FIG. 6 is a schematic diagram of an exemplary structure of the earphone in FIG. 2 observed from yet another view.

By way of example, referring to FIG. 5 and FIG. 6, the above-described connecting surface may be provided with a mounting groove extending along a circumferential direction of the core module 11, and the connecting portion 151 may be secured in the aforementioned mounting groove. The mounting groove may be configured as an annular shape, and the connecting portion 151 may be configured as an annular structure (e.g., as shown in FIG. 7) matching the mounting groove, and the connecting portion 151 is embedded within the mounting groove. Of course, the mounting groove may also be configured as a C-shape or a U-shape. For example, the mounting groove may be disposed on the rear side RS and extends to the lower side LS and the upper side US, and the connecting portion 151 may be configured as a matching C-shape or a U-shape, and the connecting portion 151 is embedded in the mounting groove.

Figure 8:
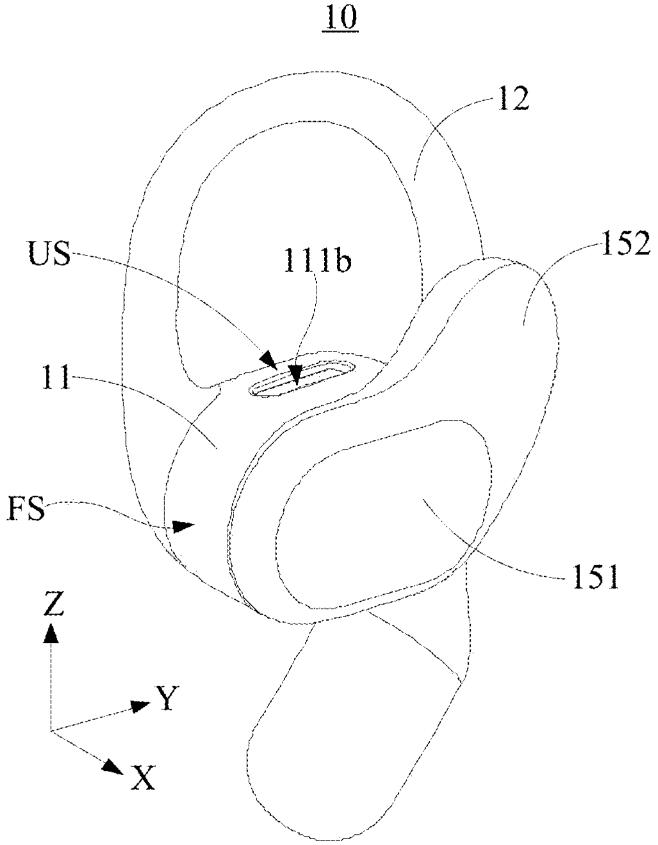
FIG. 8 is a schematic diagram of an exemplary structure of an earphone according to some embodiments of the present disclosure.
Figure 9:
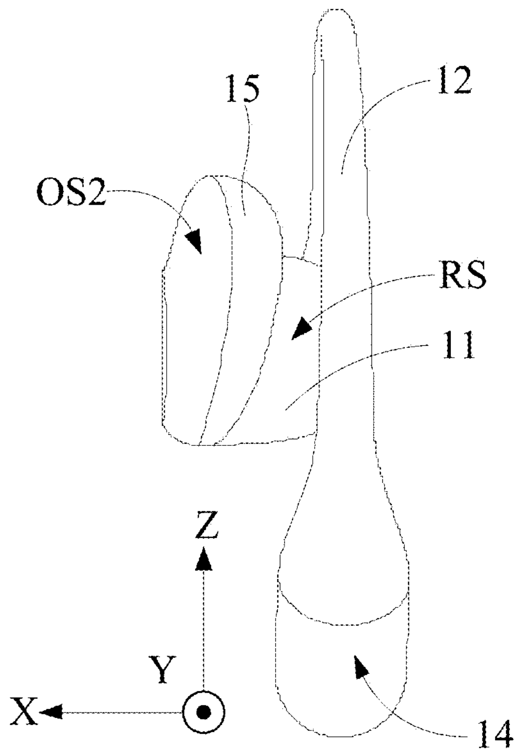
FIG. 9 is a schematic diagram of an exemplary structure of the earphone in FIG. 8 observed from one view.
Figure 10:
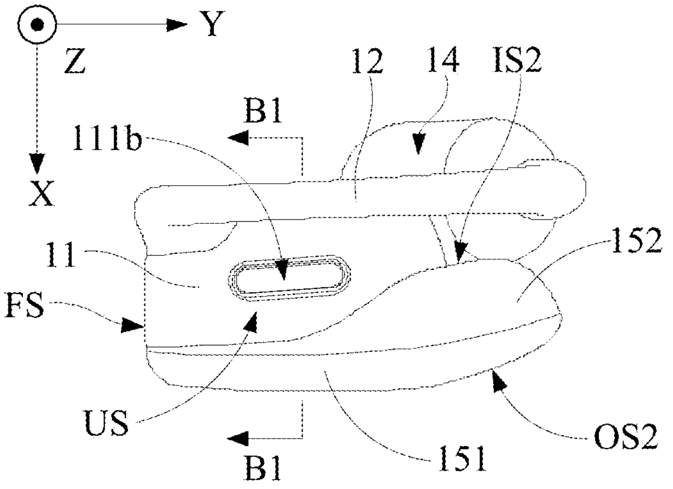
FIG. 10 is a schematic diagram of an exemplary structure of the earphone in FIG. 8 observed from another view.

By way of example, referring to FIG. 8 to FIG. 10, the connecting portion 151 may cover at least a portion of the first outer side OS1. For example, the first outer side OS1 may be covered entirely by the connecting portion 151, i.e., the first outer side OS1 as shown in FIGS. 2 to 6 is not visible in FIGS. 8 to 10. This configuration is advantageous to increase a connection area between the connecting portion 151 and the core module 11, and the connecting portion 151 and the core module 11 may be connected by means of gluing, injection molding, or the like. The extension portion 152 may have a second inner side IS2 facing toward the antihelix 105 in the wearing state and a second outer side OS2 away from the antihelix 105 in the wearing state, and at least one of the second inner side IS2 or the second outer side OS2 may be inclined toward the antihelix 105 in the extension direction of the auxiliary structure 15. For example, both the second inner side IS2 and the second outer surface OS2 are inclined toward the antihelix 105 in the extension direction of the auxiliary structure 15, i.e., the extending portion 152 bends outwardly toward the first inner side IS1 with respect to the connecting portion 151. This configuration is advantageous for the extension portion 152 to better contact the antihelix 105 and take into account the thickness of the extension portion 152. Further, referring to FIG. 14 and FIG. 15, the connecting portion 151 may not only cover at least a portion of the connecting surface (e.g., a rear side RS) described above, but also cover at least a portion of the first outer side OS1. This configuration is not only conducive to increasing the connection area between the connecting portion 151 and the core module 11, but also conducive to improving the comfort of the core module 11 in contact with the ear at the rear side RS.

Figure 4:
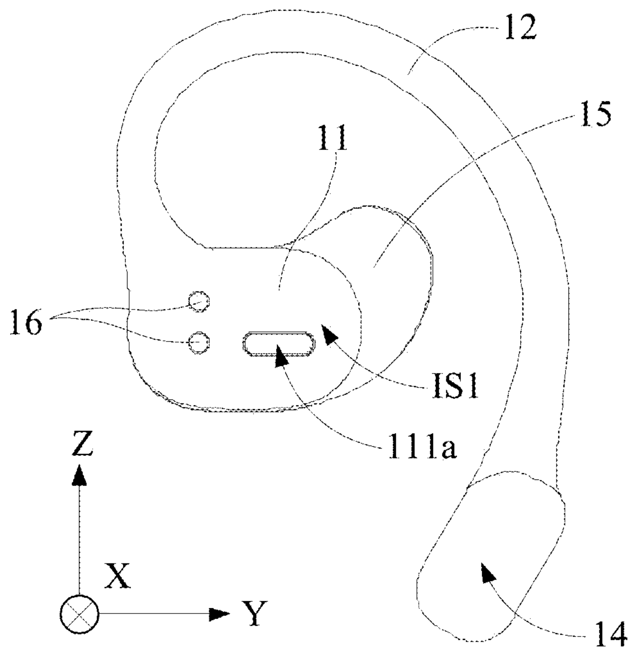
FIG. 4 is a schematic diagram of an exemplary structure of the earphone in FIG. 2 observed from one view.
Figure 13:
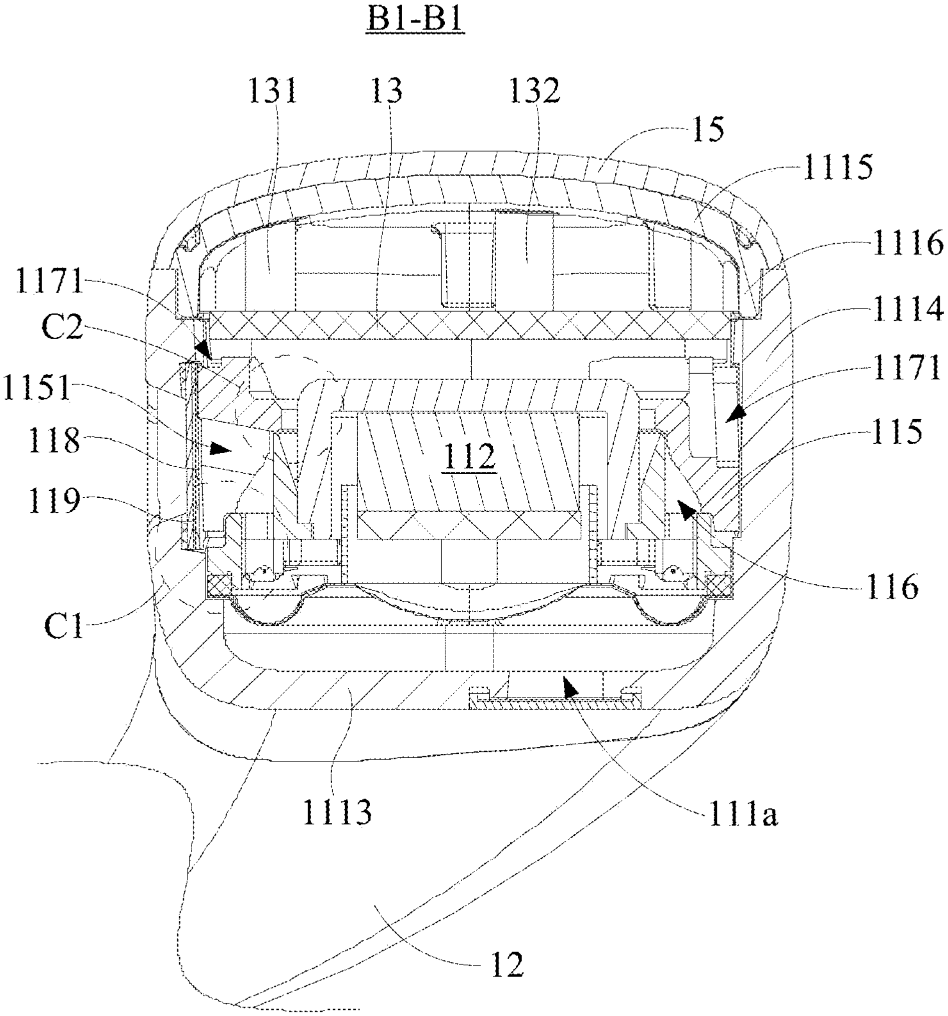
FIG. 13 is a schematic diagram of a cross-sectional structure of the earphone in FIG. 10 along a B1-B1 sectional cutting direction according to some embodiments of the present disclosure.

By way of example, referring to FIG. 4 and FIG. 13, the core module 11 may include a core housing 111 connected to the hook-like structure 12 and a speaker 112 disposed within the core housing 111. An inner side (e.g., the first inner side IS1 mentioned above) of the core housing 111 facing the ear in the wearing state may be provided with a sound outlet hole 111*a*, and a sound wave generated by the speaker 112 may propagate out through the sound outlet hole 111*a* so as to be easily transmitted into the external ear canal. It should be noted that the sound outlet hole 111*a* may also be provided on a side of the core housing 111 corresponding to the lower side LS, and may also be provided at a corner between the aforementioned inner side and the lower side LS.

Further, referring to FIG. 13 and FIGS. 2 to 11, the earphone 10 may include a main control circuit board 13 disposed within the core housing 111 and a battery 14 disposed at an end of the hook-like structure 12 away from the core module 11. The battery 14 and the speaker 112 are each coupled to the main control circuit board 13 to allow the battery 14 to power the speaker 112 under the control of the main control circuit board 13. Of course, the battery 14 and the speaker 112 may also be provided within the core housing 111.

Figure 11:
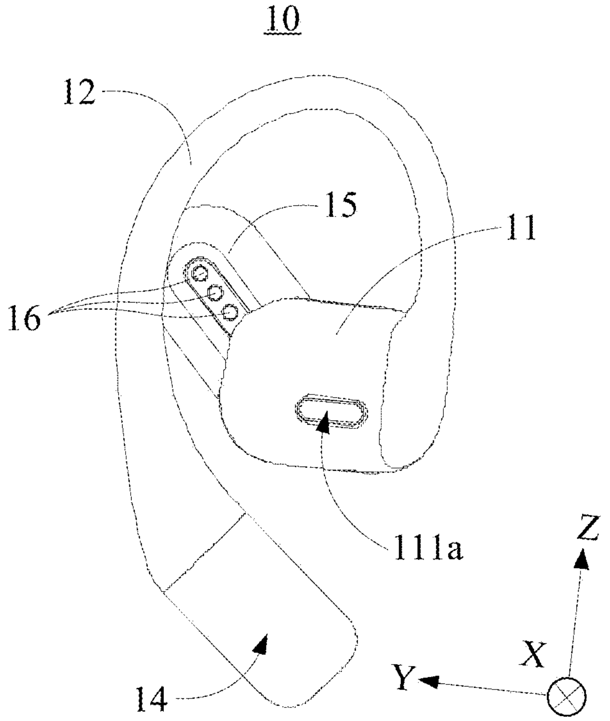
FIG. 11 is a schematic diagram of an exemplary structure of an earphone according to some embodiments of the present disclosure.

By way of example, referring to FIG. 4 or FIG. 11, one or more electrode terminals 16 may be provided on an inner side of the core housing 111 or the auxiliary structure 15 (e.g., the extension portion 152 of the auxiliary structure 15) facing toward the ear in the wearing state, and the one or more electrode terminals 16 may be coupled to the main control circuit board 13. A count of the one or more electrode terminals 16 may be two, the two electrode terminals 16 may be respectively configured as a charging positive terminal and a charging negative terminal of the earphone 10, so as to realize a charging function of the earphone 10. The count of the one or more electrode terminals 16 may also be three, wherein two of the three electrode terminals 16 may be respectively configured as the charging positive terminal and the charging negative terminal of the earphone 10, and the remaining electrode terminal 16 may be configured as a detection terminal of the earphone 10, so as to facilitate functions such as charging detection, and detecting when the earphone 10 is placed into or removed from a charging caset.

By way of example, referring to FIG. 3 and FIG. 1, since the cymba conchae 103 and the cavum conchae 102 connected thereto have a certain volume and depth, there are a distance between an inner side (e.g., the first inner side IS1 referred to above) of the core housing 111 and the cymba conchae 103 and a distance between the inner side of the core housing 111 and the cavum conchae 102 after the core module 11 is pressed against the ear region corresponding to the antihelix 105. In other words, the core module 11 may cooperate with the cymba conchae 103 and the cavum conchae 102 to form an auxiliary cavity connected to the external ear canal in the wearing state, and the sound outlet hole 111*a* may be at least partially disposed within the auxiliary cavity. Therefore, in the wearing state, sound waves generated by the speaker 112 and propagated through the sound outlet hole 111*a* may be constrained by the auxiliary cavity, i.e., the auxiliary cavity may converge the sound waves so that the sound waves may propagate more into the external ear canal, thereby increasing a volume and sound quality of the sound heard by a user in a near field, which is conducive to improving an acoustic effect of the earphone 10. Furthermore, as the core module 11 is configured not to block the external ear canal in the wearing state, the auxiliary cavity may be in a semi-open configuration. Thus, the sound waves produced by the speaker 112 and transmitted through the sound outlet hole 111*a* may primarily propagate into the external ear canal, while a small portion of the sound waves may pass through the gap between the core module 11 and the ear (e.g., a part of the cavum conchae 102 not covered by the core module 11) to the outside of the earphone 10 and the ear, creating a first leakage sound in a far field. Meanwhile, the core module 11 typically has one or more acoustic holes (e.g., a pressure relief hole 111*c* described below), and sound waves transmitted through the one or more acoustic holes may create a second leakage sound in the far field. A phase of the first leakage sound and a phase of the second leakage sound (which are close to each other) are generally opposite to each other, allowing the first leakage sound and the second leakage sound to cancel each other out in the far field, which helps to reduce leakage sound from the earphone 10 in the far field.

Further, the earphone 10 may include an adjusting mechanism connecting the core module 11 and the hook-like structure 12, and different users may adjust a position of the core module 11 in the wearing state on the ear via the adjusting mechanism to make the core module 11 located at a suitable position, thereby enabling the core module 11 to form the auxiliary cavity with the cymba conchae 103 and the cavum conchae 102. In addition, the adjusting mechanism allows the user to adjust the earphone 10 to be worn to a more stable and comfortable position.

Figure 12:
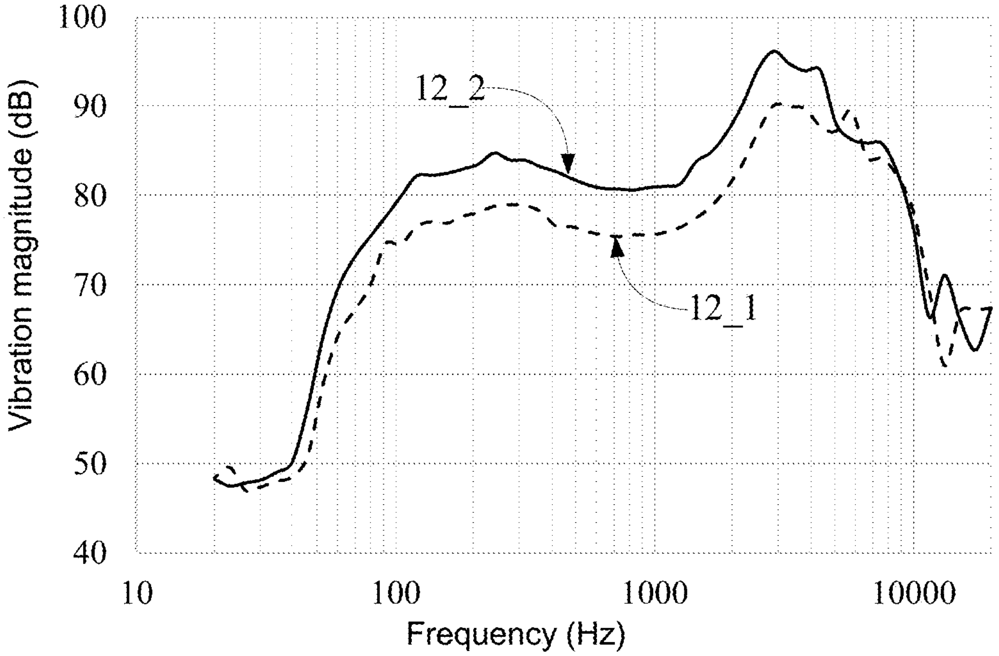
FIG. 12 is a comparative graph of frequency response curves measured at a same listening position when a core module of an earphone is located at different positions of an ear according to some embodiments of the present disclosure.

By way of example, referring to FIG. 12, the earphone 10 may be worn on the above simulator, then the position of the core module 11 on the ear of the above simulator may be adjusted, and a frequency response curve of the earphone 10 may be obtained via a detector (e.g., a microphone) disposed within the external ear canal (e.g., a position of the tympanic membrane, i.e., a listening position) of the above simulator, so as to simulate a sound-hearing effect of a user after wearing the earphone 10. The frequency response curve may characterize a change relationship between a vibration magnitude and a vibration frequency. A transverse coordinate of the frequency response curve denotes the vibration frequency, unit in Hz, and a vertical coordinate of the frequency response curve denotes the vibration magnitude, unit in dB. As shown in FIG. 12, a curve 12_1 may represent a frequency response curve of the core module 11 when the core module 11 is not cooperating with the cavum conchae 102 to form the auxiliary cavity in the wearing state, and a curve 12_2 may represent a frequency response curve of the core module 11 when the core module 11 is cooperating with the cavum conchae 102 to form the auxiliary cavity in the wearing state. Comparing the two frequency response curves illustrated in FIG. 12, it may be directly and unquestionably concluded that the curve 12_2 is located above the curve 12_1 as a whole. In other words, compared to the scenario when when the core module 11 is not cooperating with the cavum conchae 102 in the wearing state, it is more conducive to improving the acoustic effect of the earphone 10 when the core module 11 cooperates with the cavum conchae 102 to form the auxiliary cavity with the concha cavity in the wearing state.

Figure 14:
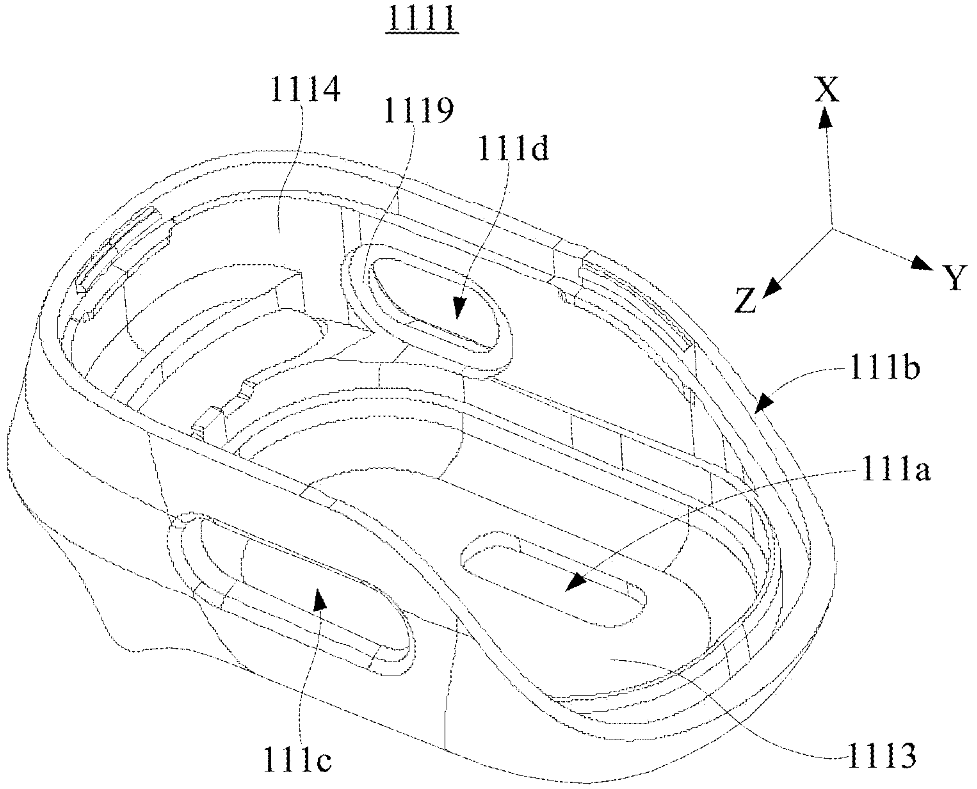
FIG. 14 is a schematic diagram of an exemplary structure of a core housing according to some embodiments of the present disclosure.
Figure 15:
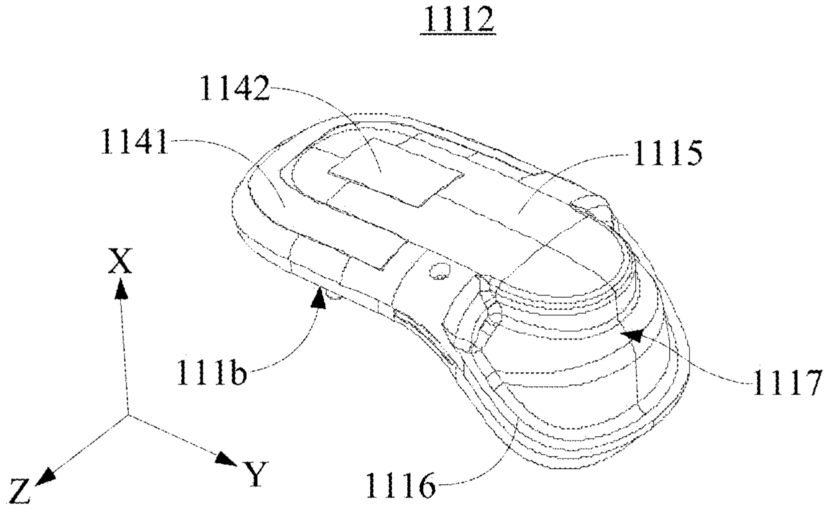
FIG. 15 is a schematic diagram of an exemplary structure of a core housing according to some embodiments of the present disclosure.

By way of example, referring to FIG. 14 and FIG. 15, the core housing 111 may include an inner core housing 1111 and an outer core housing 1112 that are snapped together with each other in the thickness direction X. The inner core housing 1111 is closer to the ear in the wearing state compared to the outer core housing 1112. A parting surface 111*b* between the outer core housing 1112 and the inner core housing 1111 may be inclined in a direction (e.g., the direction indicated by the arrow Y in FIG. 14) away from an end (hereinafter referred to as a "connecting end") at which the core module 11 is connected to the hook-like structure 12 to a side on which the inner core housing 1111 is located. Through this configuration, the connecting portion 151 may be mainly connected to the outer core housing 1112, which is not only conducive to increasing the connecting area between the auxiliary structure 15 and the core module 11 without increasing the size of the core module 11 in the length direction Y, but also conducive to simplifying the connection structure between the auxiliary structure 15 and the core module 11.

By way of example, referring to FIG. 14 and FIG. 15, the inner core housing 1111 may include a bottom wall 1113 and a first side wall 1114 connected to the bottom wall 1113, and the outer core housing 1112 may include a top wall 1115 and a second side wall 1116 connected to the top wall 1115, the second side wall 1116 and the first side wall 1114 being snapped to each other along the parting surface 111*b*, and supported by each other. When viewed along the width direction Z, and in the length direction Y (specifically, the positive direction indicated by the arrow Y in FIGS. 14 and 15), a portion of the first side wall 1114 away from the connecting end is progressively closer to the bottom wall 1113 in the thickness direction X, and a portion of the second side wall 1116 away from the connecting end is progressively farther away from the top wall 1115 in the thickness direction X, such that the parting surface 111*b*, in the direction away from the connecting end, is inclined toward the side on which the inner core housing 1111 is located. Correspondingly, the sound outlet hole 111*a* may be provided on the bottom wall 1113. Of course, the sound outlet hole 111*a* may also be provided on a side of the first side wall 1114 corresponding to the lower side LS, and may also be provided at a corner between the first side wall 1114 and the bottom wall 1113.

Further, the outer core housing 1112 may be configured with an embedding groove 1117 at least partially disposed on the second side wall 1116, and the auxiliary structure 15 is partially embedded in the embedding groove 1117 to make an outer surface of a region of the inner core housing 1111 not covered by the auxiliary structure 15 in continuous transition with an outer surface of the auxiliary structure 15, which is conducive to improving the coherence of an appearance of the earphone 10.

By way of example, referring to FIG. 14, the core housing 111 may be provided with a pressure relief hole 111*c*, and the pressure relief hole 111*c* allows a space on a side of the speaker 112 toward the main control board 13 to be connected with an external environment, so that air may freely move in and out of the aforementioned space, which is conducive to reducing a resistance of a diaphragm of the speaker 112 during vibration. The pressure relief hole 111*c* may be oriented toward the top of the head in the wearing state, which prevents the leakage sound (i.e., the second leakage sound described above) transmitted through the pressure relief hole 111*c* from being heard. Based on the Helmholtz resonance cavity, a diameter of the pressure relief hole 111*c* may be as large as possible to allow a resonance frequency of the second leakage sound to be shifted as much as possible towards a relatively high frequency band (e.g., a frequency range greater than 4 kHz), which further prevents the second leakage sound from being heard.

Further, the core housing 111 may be provided with a sound tuning hole 111*d*, the sound tuning hole 111*d* causing the resonance frequency of the second leakage sound to be shifted as much as possible towards a relatively high frequency band (e.g., a frequency range greater than 4 kHz), which further prevents the second leakage sound from being heard. An area of the sound tuning hole 111*d* may be smaller than an area of the pressure relief hole 111*c* to allow more of the space on the side of the speaker 112 toward the main control circuit board 13 to be connected to the external environment through the pressure relief hole 111*c*. Furthermore, a distance between the sound outlet hole 111*a* and the pressure relief hole 111*c* in the width direction Z may be larger than a distance between the sound outlet hole 111*a* and the sound tuning hole 111*d* in the width direction Z to avoid the sound waves propagating through the sound outlet hole 111*a* and the pressure relief hole 111*c* from canceling each other in the near field, which is conducive to increasing a volume of the sound that propagates through the sound outlet hole 111*a* and heard by the user. Correspondingly, a distance between the sound tuning hole 111*d* and the sound outlet hole 111*a* in the length direction Y may be reasonably designed according to actual needs.

By way of example, referring to FIG. 14, the sound outlet hole 111*a*, the pressure relief hole 111*c*, and the sound tuning hole 111*d* may be disposed on the inner core housing 1111. For example, the sound outlet hole 111*a* may be disposed on the bottom wall 1113 while the pressure relief hole 111*c* and the sound tuning hole 111*d* may be disposed on the first side wall 1114. The pressure relief hole 111*c* and the sound tuning hole 111*d* may be disposed on two opposite sides of the first side wall 1114 along the width direction Z, respectively. By disposing the sound outlet hole 111*a*, the pressure relief hole 111*c*, and the sound tuning hole 111*d* on the inner core housing 1111, a structure of the outer core housing 1112 is simplified, which is conducive to reducing a processing cost. In addition, since the pressure relief hole 111*c* and the sound tuning hole 111*d* are respectively provided on the two opposite sides of the first sidewall 1114 along the width direction Z, the parting surface 111*b* can be symmetrically provided with respect to a reference plane perpendicular to the width direction Z, which is conducive to improving the appearance of the core module 11.

By way of example, referring to FIG. 15, the core module 11 may include a metal functional pattern such as an antenna pattern 1141 and/or a touch pattern 1142 disposed between (e.g., on the connecting portion 151) the outer core housing 1112 and the auxiliary structure 15. The antenna pattern 1141 may be molded on an outer side of the outer core housing 1112 using a laser-direct-structuring (LDS) technology. The touch pattern 1142 may be molded on the the outer side of the outer core housing 1112 using the LDS technology, or the touch pattern 1142 may be a flexible touch circuit board pasted on the outer side of the outer core housing 1112. Further, the outer core housing 1112 may be provided with metallized holes connected to the antenna pattern 1141 and the touch pattern 1142, respectively. At this time, since the main control circuit board 13 is provided in the core housing 111, for example, the main control circuit board 13 may be connected to the outer core housing 1112, t the main control circuit board 13 may be connected to the outer core housing 1112 through elastic metal members such as a pogo-PIN, a metal dome, etc., that are in contact with inner walls of the corresponding metallized holes. For example, the antenna pattern 1141 and the touch pattern 1142 may be respectively connected to a pogo-PIN 131 and a pogo-PIN 132 soldered to the main control circuit board 13. Correspondingly, the speaker 112 may be disposed on a side of the main control circuit board 13 away from the outer core housing 1112. In this way, compared to arranging the antenna pattern 1141 and the touch pattern 1142 respectively on an inner side of the outer core housing 1112 toward the speaker 112, arranging the antenna pattern 1141 on the outer side of the outer core housing 1112 can increase a distance between the antenna pattern 1141 and the main control circuit board 13, thereby increasing an antenna clearance area, and increasing an anti-interference capability of the antenna pattern 1141. Arranging the touch pattern 1142 on the outer side of the outer core housing 1112 can shorten a distance between the touch pattern 1142 and an external signal trigger source (e.g., a finger of a user), thereby reducing a touch distance and increasing sensitivity of the touch pattern 1142 to user triggers.

Further, the antenna pattern 1141 may surround a periphery of the touch pattern 1142 to fully utilize the space on the outer side of the outer core housing 1112. The antenna pattern 1141 may be configured as a U-shape and the touch pattern 1142 may be configured as a square shape. Correspondingly, the antenna pattern 1141 and the touch pattern 1142, and the corresponding metallization holes thereof, may be provided on the top wall 1115.

By way of example, referring to FIG. 13, the core module 11 may include a bracket 115 disposed within the core housing 111, and the bracket 115 and the speaker 112 may be enclosed to form an acoustic cavity 116 to enable the acoustic cavity 116 to be separated from other structures (e.g., the main control circuit board 13, or the like) within the core housing 111, which is conducive to improving an acoustic performance of the core module 11. The core housing 111 may include an acoustic hole, for example, the acoustic hole may be at least one of the pressure relief hole 111*c* or the sound tuning hole 111*d*, and the bracket 115 may include an acoustic channel 1151 that is in flow communication with the acoustic hole and the acoustic cavity 116, so that the acoustic cavity 116 is connected to an external environment, i.e., air may freely flow in and out of the acoustic cavity 116, which is conducive to reducing the resistance of the diaphragm of the speaker 112 during vibration.

Further, the bracket 115 may cooperate with the core housing 111 to form a first adhesive reservoir groove 1171 surrounding at least a portion of the acoustic hole, and the first adhesive reservoir groove 1171 may contain a first adhesive for sealing an assembly gap between the bracket 115 and the core housing 111, i.e., waterproof sealing through the first adhesive, which is conducive to preventing the intrusion of droplets such as sweat, rainwater, or the like, from the external environment into the space where the main control circuit board 13 is located within the core housing 111. In this way, based on the Helmholtz resonance cavity, compared to the related technologies in which a silicone sleeve is held down on the core housing 111 by means of the bracket 115 for waterproof sealing, the present technological solution for waterproof sealing by means of the first adhesive can dispense with the aforementioned silicone sleeve in the related technologies, which is conducive to shortening a length of a portion (including the acoustic channel 1151 and the acoustic hole) of the acoustic cavity 116 that is connected to the external environment and enabling the resonance frequency of a leakage sound (i.e., the above-described second leakage sound) propagating out through the pressure relief hole 111*c* to be shifted as much as possible to a relatively high frequency band (e.g., a frequency range of greater than 4 kHz), thereby further avoiding the second leakage sound from being heard.

It should be noted that, if the acoustic hole is the pressure relief hole 111*c*, the first adhesive reservoir groove 1171 may surround at least a portion of the pressure relief holes 111*c*; if the acoustic hole is the sound tuning hole 111*d*, the first adhesive reservoir groove 1171 may surround at least a portion of the sound tuning holes 111*d*; if the acoustic hole is the pressure relief hole 111*c* and the sound tuning hole 111*d*, the first adhesive reservoir groove 1171 may surround at least a portion of the pressure relief hole 111*c* and at least a portion of the sound tuning hole 111*d*, respectively. For ease of description and referring to FIG. 14, the present disclosure takes the acoustic hole being the pressure relief hole 111*c* and the sound tuning hole 111*d* as an example, and the first adhesive reservoir groove 1171 surrounds at least a portion of the pressure relief holes 111*c* and at least a portion of the sound tuning holes 111*d*, respectively. Further, if the assembly gap between the bracket 115 and the core housing 111 (e.g., the bottom wall 1113) is sufficiently large, or if the bottom wall 1113 and the first side wall 1114 in the core housing 111 are not an integrally molded structural member (i.e., two separate structural members), the first adhesive reservoir groove 1171 may surround all of the aforementioned acoustic hole, i.e., the first adhesive reservoir groove 1171 is a complete annular structure.

Figure 16:
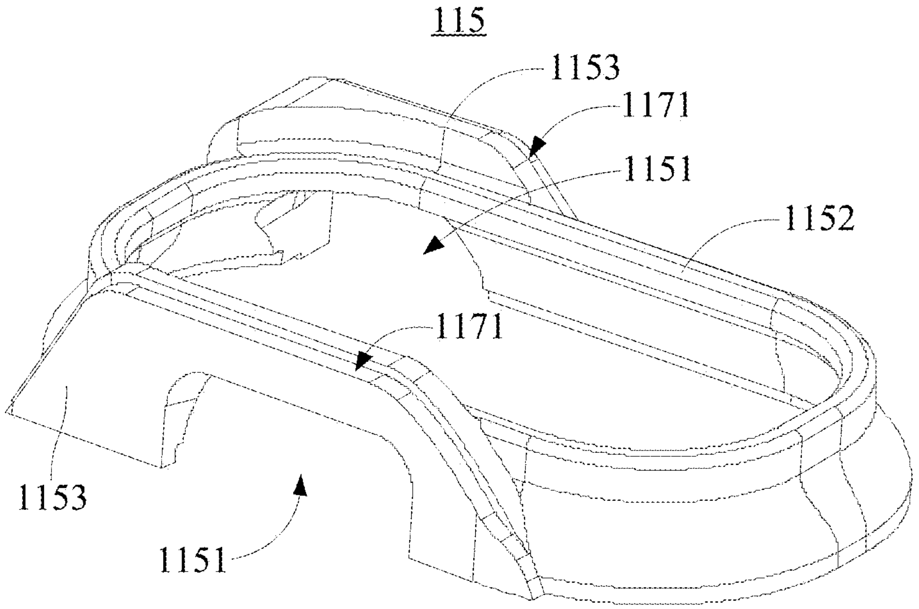
FIG. 16 is a schematic diagram of an exemplary structure of a bracket according to some embodiments of the present disclosure.

By way of example, referring to FIG. 16 and FIG. 13, the bracket 115 may include an annular main body portion 1152 and a docking portion 1153 connected to the annular main body portion 1152. The annular main body portion 1152 may be sleeved on a periphery of the speaker 112 to form the acoustic cavity 116, and the acoustic channel 1151 may penetrate through the docking portion 1153 and the annular main body portion 1152. Further, the docking portion 1153 may be disposed between the annular main body portion 1152 and the core housing 111 and surround at least a portion of the acoustic hole, and the docking portion 1153 may cooperate with the core housing 111 to form the first adhesive reservoir groove 1171. Since the acoustic hole may be the pressure relief hole 111*c* and the sound tuning hole 111*d*, correspondingly, two docking portions 1153 and two first adhesive reservoir grooves 1171 may be provided, and the two docking portions 1153 may cooperate with the first side wall 1114 to form the two first adhesive reservoir grooves 1171, respectively. Since the bracket 115 is configured as an annular shape, a side of the speaker 112 towards the main control circuit board 13 is exposed, which reduces the thickness of the core module 11 in the thickness direction X.

Figure 17:
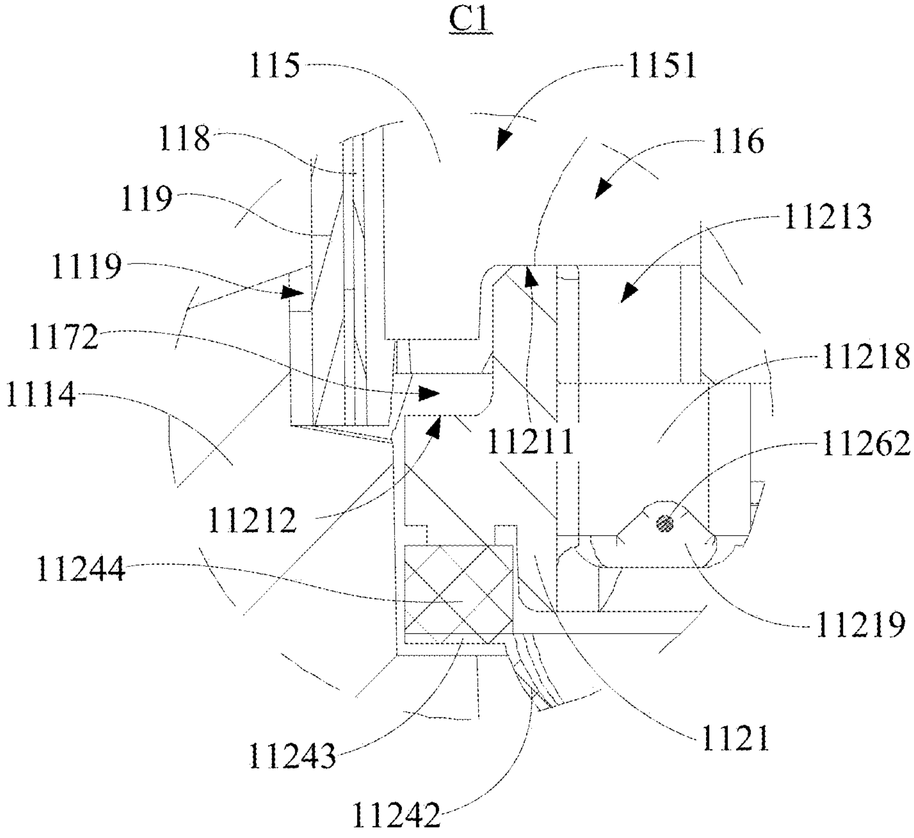
FIG. 17 is an enlarged schematic structural diagram of the earphone in FIG. 13 in a C1 region according to some embodiments of the present disclosure.
Figure 18:
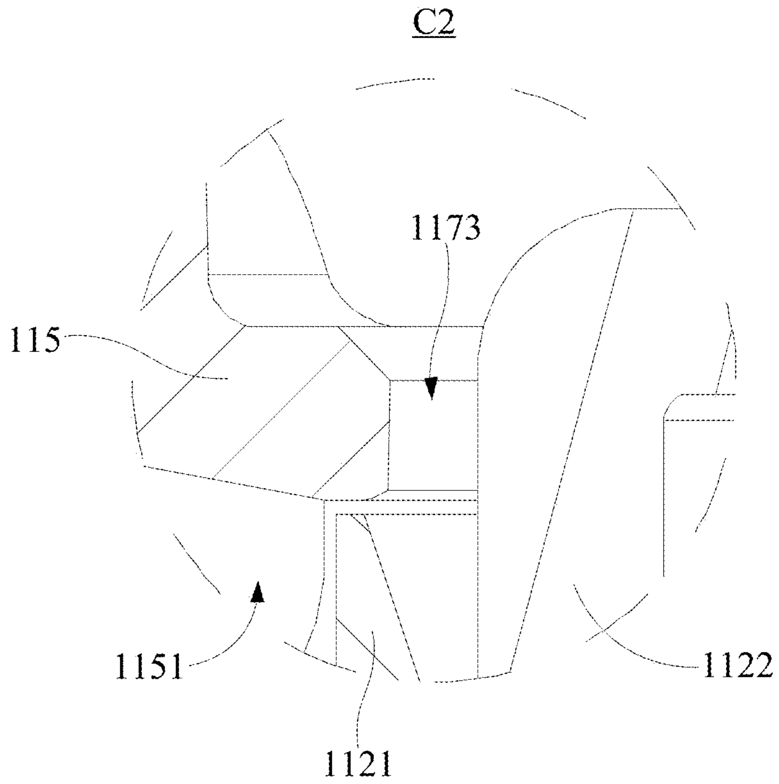
FIG. 18 is an enlarged schematic structural diagram of the earphone in FIG. 13 in a C2 region according to some embodiments of the present disclosure.

By way of example, referring to FIG. 17 and FIG. 14, the inner side of the core housing 111 may include a recessed region 1119, and the acoustic hole may be located at a bottom of the recessed region 1119. The core module 11 may include an acoustic resistance mesh 118 disposed within the recessed region 1119, and the docking portion 1153 may press the acoustic resistance mesh 118 against the bottom of the recessed region 1119. This configuration avoids the bracket 115 from scraping the acoustic resistance mesh 118 during assembly, narrows an assembly gap between the bracket 115, the acoustic resistance mesh 118, and the inner casing 1111 of the core module 11, and prevents the acoustic resistance mesh 118 from wobbling. The acoustic resistance mesh 118 may be pre-fixed to the bottom of the recessed region 1119 through a double-sided adhesive or glue. The acoustic resistance mesh 118 may also be pre-fixed to a protective steel mesh 119, and the protective steel mesh 119 may then be pre-fixed to the bottom of the recessed region 1119 through a double-sided adhesive or glue. Since the acoustic hole may be the pressure relief hole 111*c* and the sound sound tuning hole 111*d*, the inner side of the core housing may include two recessed regions 1119, and accordingly, two acoustic resistance meshes 118 may be provided.

Further, the first glue may further seal an assembly gap between the bracket 115 and the acoustic resistance mesh 118 and/or an assembly gap between the acoustic resistance mesh 118 and the core housing 111 (e.g., a side wall of the recessed region 1119), which further facilitates waterproof sealing.

By way of example, referring to FIG. 13, FIG. 14, and FIG. 16, the docking portion 1153 may be configured to form a bottom wall and one side wall of the first adhesive reservoir groove 1171, and the core housing 111 may form another side wall of the first adhesive reservoir groove 1171. The side wall of the first adhesive reservoir groove 1171 formed by the core housing 111 and the side wall of the first adhesive reservoir groove 1171 formed by the docking portion 1153 may be arranged opposite to each other, so that the first adhesive reservoir groove 1171 has a certain width and depth. Of course, the docking portion 1153 may be configured to form one side wall of the first adhesive reservoir groove 1171, and the core housing 111 may be configured to form the bottom wall and another side wall of the first adhesive reservoir groove 1171. Alternatively, the docking portion 1153 may be configured to form one side wall and a portion of the bottom wall of the first adhesive reservoir groove 1171, and the core housing 111 may be configured to form another side wall and another portion of the bottom wall of the first adhesive reservoir groove 1171.

By way of example, referring to FIGS. 17 to 25, the speaker 112 may include a frame 1121 and a magnetic cover 1122 connected to the frame 1121, and a lower end of the bracket 115 may be supported on the frame 1121. The acoustic channel 1151 may be configured open on a side facing the frame 1121, and the frame 1121 further seals the open portion of the acoustic channel 1151. At this case, it may be simply considered that the first adhesive reservoir groove 1171 surrounds a portion of the acoustic hole, allowing for subsequent filling of the first adhesive reservoir groove 1171 with adhesive using techniques such as dispensing, etc.

Further, the speaker 112 may include a diaphragm 1123 and a folded ring 1124, and the folded ring 1124 is connected with the diaphragm 1123 and the frame 1121. After the speaker 112 is assembled within the core housing 111, the diaphragm 1123, the folded ring 1124, its surrounding frame 1121 and the core housing 111 may block further intrusion of droplets such as sweat, rain, or the like, from intruding through the sound outlet hole 111*a* into the space within the core housing 111 where the main control circuit board 13 is located. Based on this, the speaker 112 may include a magnet 1125 disposed within the magnetic cover 1122 and a coil 1126 connected to the diaphragm 1123. The magnet 1125 and the magnetic cover 1122 may form a magnetic gap, and the coil 1126 may extend into the magnetic gap. The speaker 112 may include a magnetic guide plate 1127 disposed on a side of the magnet 1125 toward the diaphragm 1123, and the magnetic guide plate 1127, the magnetic cover 1122, and the coil 1126 may overlap in a vibrational direction (e.g., the thickness direction X, which will not be repeated hereinafter) of the speaker 112 to allow more magnetic field lines of a magnetic field generated by the magnet 1125 to pass through the coil 1126.

In some embodiments, the frame 1121 may include a first annular platform 11211 and a second annular platform 11212 arranged in a stepped shape, and the second annular platform 11212 may surround a periphery of the first annular platform 11211. A portion of the lower end of the bracket 115 may be supported by the first annular platform 11211, and another portion of the lower end of the bracket 115 may form a gap region with the second annular platform 11212, so that the bracket 115, the frame 1121, and the core housing 111 may cooperate to form a second adhesive reservoir groove 1172, and the second adhesive reservoir groove 1172 may contain a second adhesive for sealing an assembly gap between any two of the bracket 115, the frame 1121, and the core housing 111 for a corresponding waterproof seal.

In some embodiments, an upper end of the bracket 115 may be lapped on the frame 1121 and cooperate with the frame 1121 and the magnetic cover 1122 to form a third adhesive reservoir groove 1173. The third adhesive reservoir groove 1173 may contain a third adhesive for sealing an assembly gap between the bracket 115, the frame 1121, and the magnetic cover 1122 for waterproof seal.

It should be noted that in a specific assembly process of the core module 11, the following process operations may be included, and the sequence of the operations in the process may be adjusted as needed. (1) The acoustic resistance mesh 118 and the protective steel mesh 119 may be pre-fixed to the bottom of the recessed region 1119 through a double-sided adhesive. (2) The speaker 112 may be fixed to the bottom wall 1113 and an adhesive may be dispensed to the assembly gap between the speaker 112 and the bottom wall 1113, and the corresponding adhesive partially accumulates on the second annular platform 11212 of the speaker 112. (3) The bracket 115 may be fixed to the speaker 112 before the adhesive in operation (2) is cured, and the lower end of the bracket 115 is supported by the first annular platform 11211 of the speaker 112, so that the gap between the lower end of the bracket 115 and the second annular platform 11212 is also filled with the adhesive, and the docking portion 1153 of the bracket 115 presses against the acoustic resistance mesh 118 and cooperates with the first sidewall 1114 to form the first adhesive reservoir groove 1171, and the upper end of the bracket 115 is lapped on the frame 1121 and cooperates with the frame 1121 and the magnetic cover 1122 to form the third adhesive reservoir groove 1173. (4) An adhesive may be dispensed to the first adhesive reservoir groove 1171, the third adhesive reservoir groove 1173, an assembly gap between the lower end of the bracket 115, the speaker 112, and the inner core housing 1111. Since the assembly gap between the lower end of the bracket 115 and the speaker 112 and the assembly gap between the lower end of the bracket 115 and the inner core housing 1111 are close to the first adhesive reservoir groove 1171, the assembly gap between the lower end of the bracket 115 and the speaker 112 and the assembly gap between the lower end of the bracket 115 and the inner core housing 1111 may be simply regarded as a continuation of the first adhesive reservoir groove 1171, i.e., the first adhesive reservoir groove 1171 and the second adhesive reservoir groove 1172 may be in flow communication.

Based on the above descriptions, whether by the first adhesive (and the second adhesive) or the silicone sleeve, the waterproof performance of the earphone 10 at the assembly gap of the bracket 115 and the core housing 111 can be improved, so as to make the space where the main control circuit board 13 is located in the core housing 111 have a high waterproof level. Based on this, an interior of the speaker 112 may include first accommodation space that is in flow communication with the acoustic cavity 116, and the speaker 112, the bracket 115, and the core housing 111 may further cooperate to form second accommodation space that is outside the speaker 112 and isolated from the acoustic cavity 116. The first accommodation space may be formed by the cooperation of the frame 1121, the magnetic cover 1122, the diaphragm 1123, and the folded ring 1124, so structures such as the magnet 1125, the coil 1126, and the magnetic guide plate 1127 may be provided in the first accommodation space, and structures such as the main control circuit board 13 may be provided in the second accommodation space. In other words, for the speaker 112, the first accommodation space and the second accommodation space may be two spaces with a certain volume inside and outside the speaker 112, respectively. It should be noted that the first accommodation space may be connected to the acoustic cavity 116 through a through-hole 11213 in the frame 1121. In the above embodiments where the acoustic hole is the pressure relief hole 111*c* (or the sound tuning hole 111*d*), the through-hole 11213 may be provided on a side of the frame 1121 near the pressure relief hole 111*c* (or the sound tuning hole 111*d*); and in the above embodiments where the acoustic hole is the pressure relief hole 111*c* and sound tuning hole 111*d*, two sets of through-holes 11213 may be provided, wherein one set of through-holes 11213 may be provided on the side of the frame 1121 near the pressure relief hole 111*c*, and the other set of through-holes 11213 may be provided on the other side of the frame 1121 near the sound tuning hole 111*d*.

Figure 23:
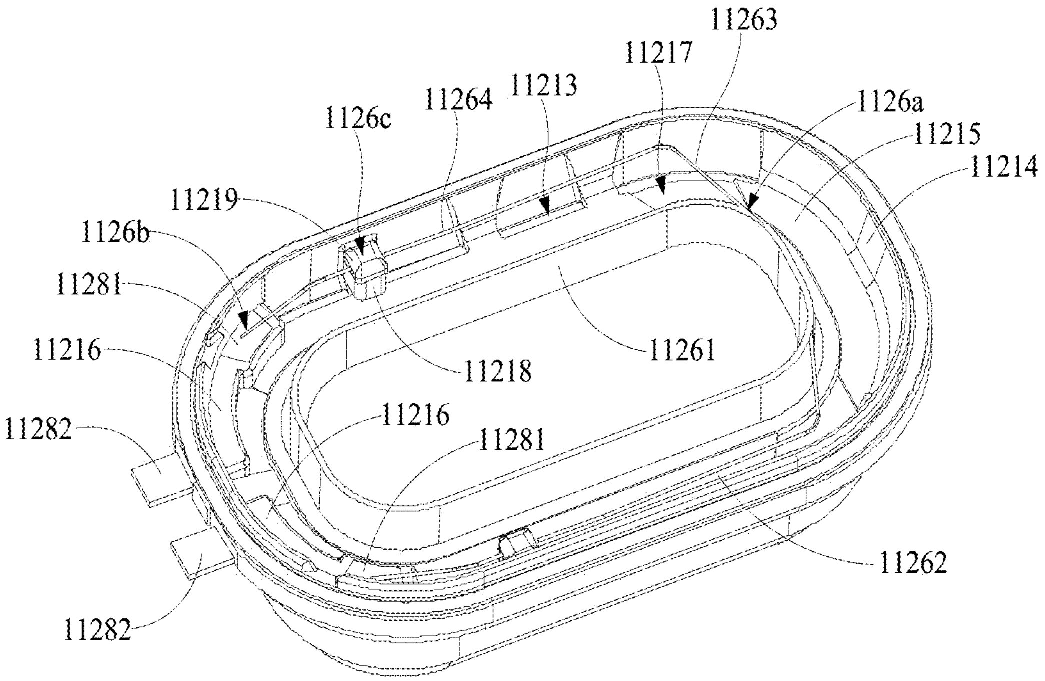
FIG. 23 is a schematic diagram of a portion of the structure of the speaker in FIG. 19 according to some embodiments of the present disclosure.
Figure 25:
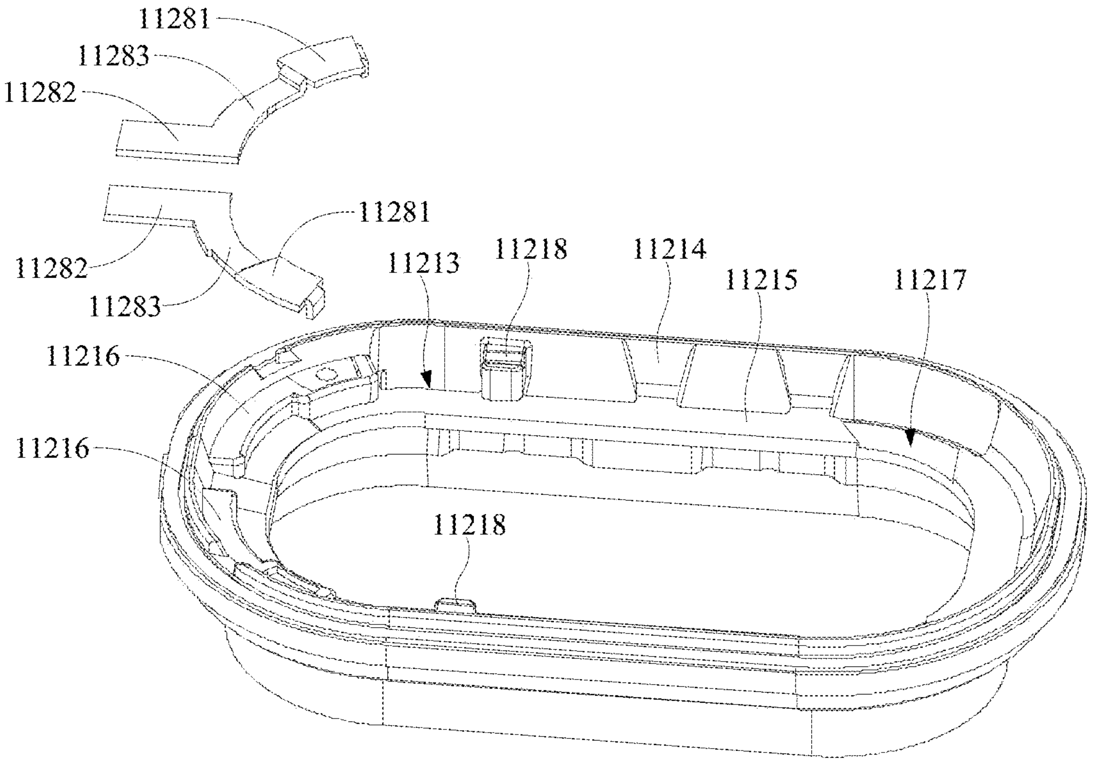
FIG. 25 is a schematic diagram of a disassembled structure of a frame in FIG. 19 according to some embodiments of the present disclosure.

By way of example, referring to FIG. 23 and FIG. 25, the speaker 112 may include metal members 1128 disposed on the frame 1121, and a count of the metal members 1128 may be two, wherein one of the two metal members 1128 may be configured as a positive terminal of the speaker 112, and the other one of the two metal members 1128 may be configured as a negative terminal of the speaker 112. Each of the two metal members 1128 may include a first pad 11281, a second pad 11282, and a transition portion 11283 connecting the first pad 11281 and the second pad 11282. The first pad 11281 and the second pad 11282 may be exposed from the frame 1121. At this time, the first pad 11281 may be located within the first accommodation space and connected to the coil 1126, and the second pad 11282 may be located within the second accommodation space, so that the coil 1126 may be connected to the main control circuit board 13 via the metal members 1128. A distance between the first pads 11281 of the two metal members 1128 may be greater than the distance between the second pads 11282 of the two metal members 1128. In this manner, on one hand, although the first pads 11281 are provided in the first accommodation space with a lower waterproofing level, the distance between the first pads 11281 of the two metal members 1128 is relatively large, so that it is difficult for droplets of sweat, rainwater, or the like, to invade the first accommodation space via the acoustic hole (e.g., the pressure relief hole 111*c* or the sound tuning hole 111*d*) and the acoustic channel 1151, thus avoiding a short circuit of the first pads 11281 of the two metal members 1128 and preventing damage to the earphone 10. On the other hand, since the second pads 11282 are provided in the second accommodation space with a relatively high waterproofing level, even if the distance between the second pads 11282 of the two metal members 1128 is relatively small, it does not cause a short circuit, thereby preventing the earphone 10 from being damaged. In addition, due to the relatively small distance between the second pads 11282 of the two metal members 1128, a wire or a flexible circuit board connecting the two metal members 1128 to the main control circuit board 13 can be shortened, thereby simplifying an alignment structure of the speaker 112 and reducing costs.

By way of example, referring to FIG. 23, the frame 1121 may have a long axis direction (e.g., a length direction Y) and a short axis direction (e.g., a width direction Z) that are perpendicular to the vibration direction of the speaker 112 and orthogonal to each other. A dimension of the frame 1121 in the long axis direction may be greater than a dimension of the frame 1121 in the short axis direction. For example, a length-width relationship of the frame 1121 may match a length-width relationship of the core module 11. At this case, the two metal members 1128 may be located at a same end in the long axis direction to simplify the alignment structure of the earphone 10. Correspondingly, the two metal members 1128 may be disposed between the two sets of through-holes 11213 in the short axis direction.

In some embodiments, the transition portion 11283 may be embedded within the frame 1121. For example, the two metal members 1128 may be injection molded with the frame 1121 through a metal insert process. In this way, since the transition portion 11283 is not exposed from the frame 1121, even if a distance between the two transition portions 11283 of the two metal members 1128 is small, it may not lead to short-circuit, thereby preventing the earphone 10 from being burned out.

In some embodiments, the transition portion 11283 may be sealed on the frame 1121 in a waterproof manner, such as by first securing the metal members 1128 to the frame 1121 before covering the transition portion 11283 by gluing the transition portion 11283. In this way, even if the distance between the two transition portions 11283 of the two metal members 1128 is small, the transition portions 11283 are watertightly sealed on the frame 1121, so that the transition portions 11283 of the two metal members 1128 do not short-circuit, thereby preventing the earphone 10 from being burned out.

By way of example, referring to FIG. 25, the second pads 11282 of the two metal members 1128 may be arranged side by side and spaced apart, and one end of each transition portion 11283 may be connected to a corresponding second pad 11282, the two transition portions 11283 may respectively extend in directions away from each other, and each first pad 11281 may be connected to the other end of the corresponding transition portion 11283, such that the distance between the first pads 11281 of the two metal members 1128 is greater than the distance between the second pads 11282 of the two metal members 1128. A degree of curvature of the transition portions 11283 may be consistent with a trend of change in a region on the frame 1121 where the metal members 1128 are provided.

By way of example, referring to FIG. 25, the frame 1121 may include an annular peripheral wall 11214, an annular flange 11215 connected to an inner wall surface of the annular peripheral wall 11214, and one or more bosses 11216 disposed at a junction of the annular flange 11215 and the annular peripheral wall 11214. The magnetic cover 1122 may be fixed on the annular flange 11215 so as to facilitate the connection of the magnetic cover 1122 to the frame 1121. The one or more bosses 11216 may be configured to support the two metal members 1128 so that the transition portions 11283 may be hidden within the one or more bosses 11216 and the second pads 11282 may be exposed from the one or more bosses 11216 to facilitate the connection of the coil 1126 to the two metal members 1128, and avoiding short circuit of the transition portions 11283 of the two metal members 1128.

By way of example, referring to FIG. 23 and FIG. 25, the one or more bosses 11216 may include two bosses 11216 spaced apart along a circumferential direction of the annular peripheral wall 11214. For example, one boss 11216 may be disconnected in its center and divided into two bosses 11216. At this case, each of the one or more bosses 11216 may support one of the two metal members 1128, i.e., the transition portions 11283 of the two metal members 1128 may be hidden within the two bosses 11216, respectively. In this way, even if there are droplets of sweat, rain, or the like, accumulated at one of the two bosses 11216 and the exposed second pad 11282 thereon, it is difficult for the droplets to flow to the other boss 11216 and the exposed second pad 11282 thereon, which is conducive to avoiding short circuit of the second pads 11282 of the two metal members 1128.

Figure 19:
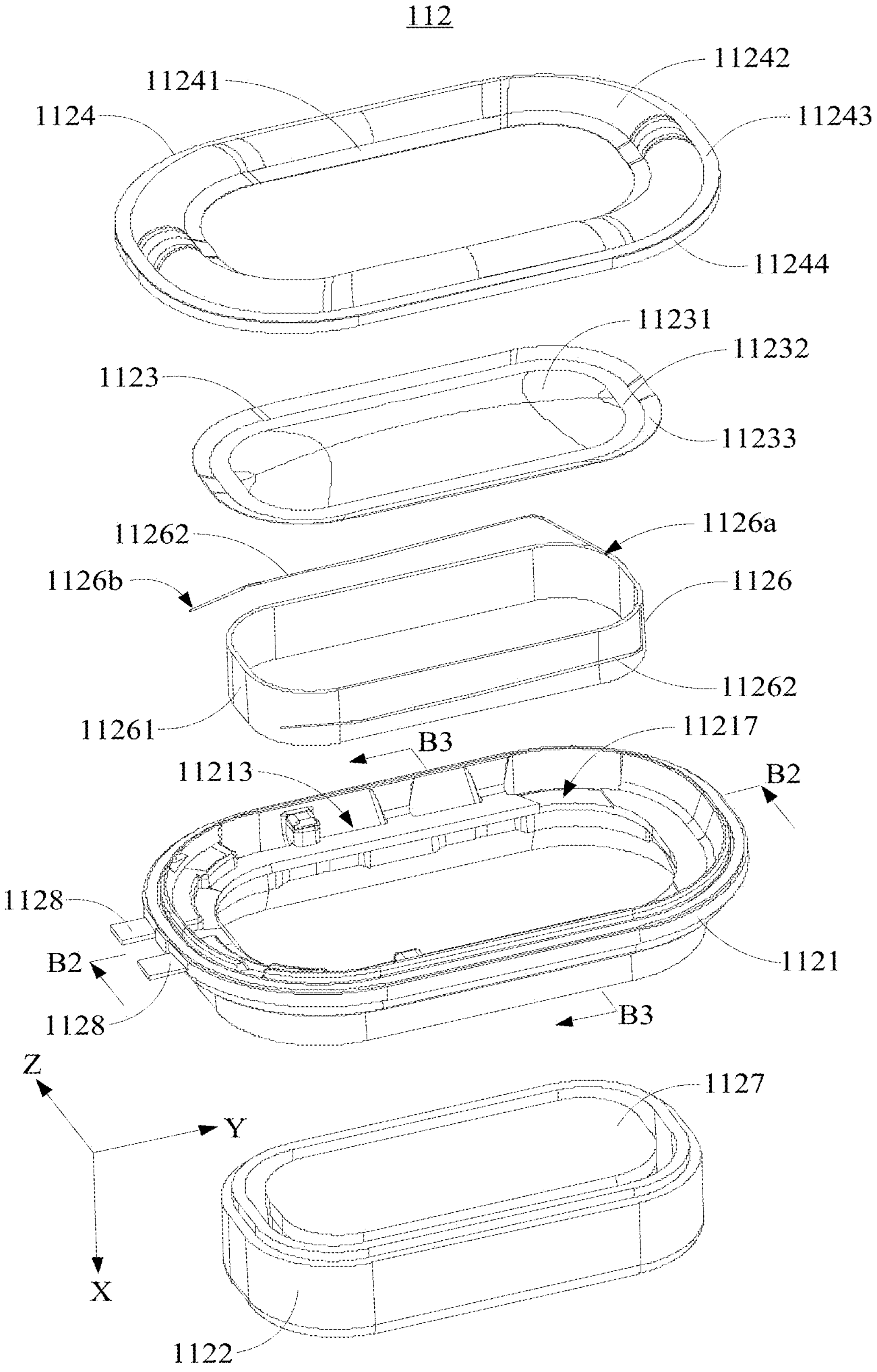
FIG. 19 is a schematic diagram of a disassembled structure of a speaker provided by the present disclosure.
Figure 20:
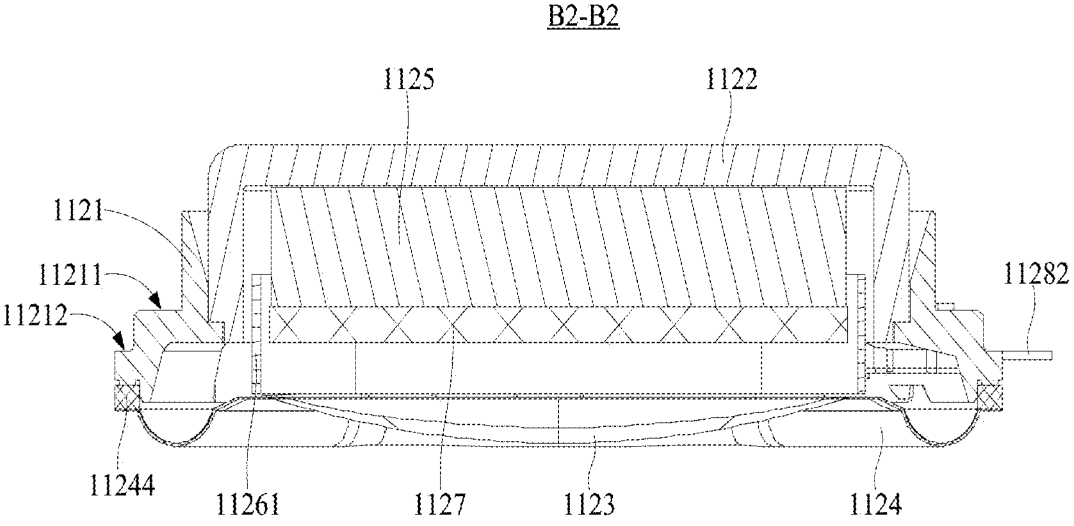
FIG. 20 is a schematic diagram of a cross-sectional structure of the speaker in FIG. 19 along a B2-B2 sectional cutting direction according to some embodiments of the present disclosure.

By way of example, referring to FIGS. 19 and 23, the coil 1126 may include an annular body 11261 and a lead 11262 connected to the annular body 11261. The annular body 11261 and the lead 11262 may be a same wire. Based on this, according to actual demand, the annular body 11261 may be obtained by coiling the aforementioned wire by a certain count of turns, and the annular body 11261 may be connected to the diaphragm 1123. The lead 11262 may be two ends of the wire 11262, that is, a count of leads 11262 may be two, and the two leads 11262 may be connected to the second pads 11282 of the two metal members 1128, respectively. Furthermore, the annular body 11261 may be disposed on an inner side of the frame 1121, such as extending into the magnetic gap formed by the magnet 1125 and the magnetic cover 1122. The leads 11262 follow the annular body 11261 in motion relative to the frame 1121 after an excitation signal is inputted to the speaker 112, and the annular body 11261 pushes the diaphragm 1123 to generate sound waves.

By way of example, referring to FIG. 23, the frame 1121 may be provided with an avoidance recess 11217, and a positive projection of the lead 11262 along the vibration direction of the speaker 112 may fall at least partially within the avoidance recess 11217, wherein, a depth of the avoidance recess 11217 may be greater than 0 and less than or equal to 0.2 mm. In this way, a distance between the lead 11262 and the frame 121 can be increased to a certain extent by the avoidance recess 11217 to reduce the risk of collision between the lead 11262 and the frame 1121 during movement of the lead 11262 following the annular body 11261 with respect to the frame 1121, especially when the speaker 112 is operating at a small vibration amplitude, and to reduce a travel distance of the lead 11262 after collision with the frame 1121, especially when the speaker 112 is operating at a large vibration amplitude, which improves the reliability of the speaker 112.

In some embodiments, when no excitation signal is input to the speaker 112, a distance between the lead 11262 and a bottom of the avoidance recess 11217 in the vibration direction of the speaker 112 may be greater than a maximum vibration amplitude of movement of the lead 11262 with respect to the frame 1121 to further reduce the risk of collision of the lead 11262 with the frame 1121 and reduce the travel distance of the lead 11262 after collision with the frame 1121.

In some embodiments, the avoidance recess 11217 may be close to an end at which the lead 11262 is connected to the annular body 11261, i.e., the avoidance recess 11217 may be correspondingly provided at a position at which the lead 11262 has a relatively large movement when the lead 1126 follows the annular body 11261 to move. The position is also a position where the risk of collision of the lead 11262 with the frame 1121 is relatively high, to further reduce the risk of collision of the lead 11262 with the frame 1121 and reduce the travel distance of the lead 11262 after collision of the lead 11262 with the frame 1121.

By way of example, referring to FIG. 23, the lead 11262 may include a first extension portion 11263 connected to the annular body 11261 and a second extension portion 11264 bent with respect to the first extension portion 11263, and a positive projection of the first extension portion 11263 along the vibration direction of the speaker 112 may fall at least partially within the avoidance recess 11217 to reduce the risk of collision of the lead 11262 with the frame 1121 and reduce the travel distance of the lead 11262 after collision with the frame 1121. At least a portion of a positive projection of the second extension portion 11264 along the vibration direction of the speaker 112 that is close to the first extension portion 11263 may fall within the avoidance recess 11217 to further reduce the risk of collision of the lead 11262 with the frame 1121 and the travel distance of the lead 11262 after collision with the frame 1121. Correspondingly, an end of the second extension portion 11264 that is away from the first extension portion 11263 may be connected to the second pad 11282. Of course, in some other embodiments, the lead 11262 as a whole may be configured as a straight line or an arc.

In some embodiments, a ratio between a length of the second extension portion 11264 and a length of the first extension portion 11263 may be in a range of 2-15. If the aforementioned ratio is too small, the vibration amplitude of an end of the second extension portion 11264 away from the first extension portion 11263 may be relatively large, which is likely to result in the second extension portion 11264 breaking or being disconnected at the second pad 11282. If the aforementioned ratio is too large, a self-weight of the second extension portion 11264 may be too large and the second extension portion 11264 may pull the first extension portion 11263 excessively, which is likely to cause the overall size of the speaker 112 to be relatively larger, which is not conducive to miniaturization of the earphone 10. Further, a distance between the second extension portion 11264 and the annular body 11261 in a direction perpendicular to the vibration direction (e.g., the width direction Z) of the speaker 112 may be in a range of 1.1 mm-2.1 mm. If the aforementioned distance is too small, the vibration amplitude of the second extension portion 11264 may be relatively large, which is likely to cause the collision of the second extension portion 11264 with the frame 1121, and the second extension portion 11264 breaking or desoldering at the second pad 11282. If the aforementioned ratio is too large, the first extension portion 11263 may deform excessively toward the frame 1121 due to an excessive large self-weight, which is likely to cause the collide with the frame 1121 and increase the overall size of the speaker 112, which is not conducive to miniaturization of the earphone 10.

In some embodiments, such as FIG. 23, an angle between the second extension portion 11264 and the first extension portion 11263 may be an obtuse angle, which reduces a force between the second extension portion 11264 and the first extension portion 11263, thereby increasing the reliability of the lead 11262.

Figure 24:
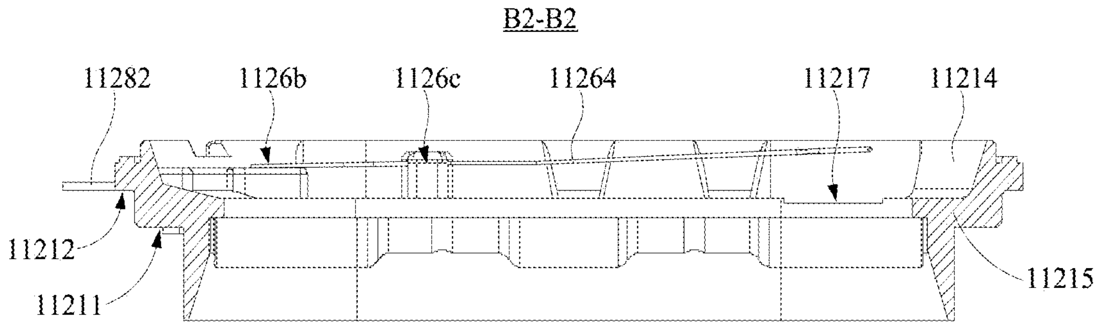
FIG. 24 is a schematic diagram of a cross-sectional structure of a frame in FIG. 19 along the B2-B2 sectional cutting direction according to some embodiments of the present disclosure.

In some embodiments, such as FIG. 24, distances of at least a portion of the second extension portion 11264 from the frame 1121 in the vibration direction of the speaker 112 may decrease gradually in an extension direction (e.g., in a direction opposite to the direction indicated by the arrow Y) away from the first extension portion 11263, so that a portion of the second extension portion 11264 close to the first extension portion 11263 and the first extension portion 11263 in the vibration direction of the speaker 112 are as far away from the frame 1121 as possible, thereby reducing the risk of collision of the lead 11262 with the frame 1121 and reducing the travel distance of the lead 11262 after collision with the frame 1121.

In some embodiments, the frame 1121 may be provided with a plurality of through-holes 11213 spaced around the annular body 11261, and the avoidance recess 11217 may be connected to the through-holes 11213 to simplify the structure of the frame 1121. A positive projection of the second extension portion 11264 along the vibration direction of the speaker 112 may fall at least partially within the through-holes 11213 to reduce an area of possible collision between the second extension portion 11264 and the frame 1121, thereby increasing the reliability of the speaker 112. The plurality of through-holes 11213 may be divided into two sets, and positive projections of the second extension portions 11264 of the two leads 11262 along the vibration direction of the speaker 112 may at least partially fall within the two sets of through-holes 11213, respectively. Therefore, each set of through-holes 11213 may in include a plurality of through-holes 11213 spaced apart from each other, for example, each set of through-holes 11213 may in include four through-holes 11213 as shown in FIG. 23. Of course, each set of through-holes 11213 may also include only one relatively large through-hole 11213.

By way of example, referring to FIG. 23 and FIG. 25, the frame 1121 may be provided with pads connected to the lead 11262, and a count of the pads may be two, with one of the two pads being configured as a positive terminal of the speaker 112 and the other one of the two pads being configured as a negative terminal of the speaker 112. The pads may be the two metal members 1128 described above, or may be configured in other ways known to those skilled in the art, which is not repeated here. Furthermore, the lead 11262 may have a first end **1126*a* close to the annular body 11261 and a second end 1126*b* away from the annular body 11261, and the second end 1126*b* may be secured to a corresponding pad. For example, the end (i.e., the second end 1126*b*) of the lead 11262 away from the annular body 11261 may be soldered to the first pad 11281. A ratio between a length of the lead 11262 and a maximum vibration amplitude of movement of the coil 1126 with respect to the frame 1121 may be in a range of 8-75. If the aforementioned ratio is too small, the vibration amplitude of the second end 1126*b* may be relatively large, which is likely to result in the lead 11262 being broken or desoldered at the corresponding pad. If the aforementioned ratio is too large, the lead 11262 may deform excessively toward the frame 1121 due to an excessively large self-weight, which is likely to result collision of the lead 11262 with the frame 1121 and cause the overall size of the speaker 112 to be relatively large, which is not conducive to miniaturization of the earphone 10. In short, the present technical solution is conducive to ameliorating the technical problem of force concentration of the lead 11262**.

In some embodiments, a ratio between a wire diameter of the lead 11262 and a length of the lead 11262 may be in a range of 50-1000. If the above ratio is too small, it is likely to cause the lead 11262 to break due to an excessively small stiffness. If the ratio is too large, the lead 11262 may deform excessively toward the frame 1121 due to an excessively large self-weight and thus prone to collide with the frame 1121.

In some embodiments, a fixed position **1126*c* of the lead 11262 between the first end 1126*a* and the second end 1126*b* may be further fixed to the frame 1121, so that the vibration of the lead 11262 following the annular body 11261 is difficult to transmit to the aforementioned pad. This is conductive to avoiding resonance or peak frequency deviation towards higher frequency bands (e.g. above 10 kHz) at one end of lead 11262 near the pad, thereby reducing the risk of the lead 11262 breakage or desoldering at the aforementioned pad. A portion of the lead 11262 between the first end 1126*a* and the fixed position 1126*c* may be suspended with respect to the frame 1121, and a portion of the lead 11262 between the second end 1126*b* and the fixed position 1126*c* may also be suspended with respect to the frame 1121 to reduce the risk of collision of the lead 11262 with the frame 1121**.

By way of example, referring to FIG. 19 and FIG. 23, the frame 1121 may be provided with a support block 11218, the support block 11218 is disposed between the first end **1126*a* and the second end 1126*b*, and may correspond to the fixed position 1126*c*. At this case, the lead 11262 may be secured to the support block 11218 at the fixed position 1126*c* such that at least a portion of the lead 11262 is suspended with respect to the frame 1121. In this way, since the support block 11218 is a part of the structure of the frame 1121, the fixed position 1126*c* is made more accurate, which is conducive to avoiding a worker from arbitrarily fixing a random position on the lead 11262 on the frame 1121, thereby improving product consistency of the speaker 112** in mass production and improving a yield rate.

It should be noted that in some embodiments of the present disclosure where the frame 1121 is provided with a plurality of through-holes 11213 spaced around the annular body 11261, the support block 11218 may be disposed between two adjacent through-holes 11213, which is a simple and reliable structure. In addition, the support block 11218 may also act as a reinforcing bar of the frame 1121 to increase a structural strength of the frame 1121. Furthermore, for the lead 11262 corresponding to the positive terminal or the negative terminal of the speaker 112, a plurality of (e.g., two, three, etc) fixed positions **1126*c* and corresponding support blocks 11218** may be provided.

In some embodiments, the lead 11262 may be secured to the support block 11218 by an adhesive 11219, which may be resilient after curing, for example, a soft glue such as silicone. In this way, it is beneficial to absorb the vibration of the lead 11262 following the annular body 11261 and reduce a force of the lead 11262 at the fixed position **1126*c*, thereby reducing the risk of breakage of the lead 11262. Of course, in application scenarios where the risk of lead breakage is low, the adhesive 11219** may also be a hard glue.

In some embodiments, a side of the support block 11218 in contact with the lead 11262 may be provided with a locating recess, so that the consistency of the relative position of the support block 11218 and the lead 11262 can be increased in mass production, thereby increasing the yield rate of the product.

It should be noted that in some embodiments of the present disclosure where the lead 11262 is secured to the support block 11218 by the adhesive 11219, the avoidance recess may also act as an adhesive reservoir groove to facilitate the accumulation of enough adhesive 11219 to secure the lead 11262.

In some embodiments, a first length of the lead 11262 between the first end **1126*a* and the support block 11218 may be greater than a second length of the lead 11262 between the second end 1126*b* and the support block 11218, so as to reduce the risk of breakage of the lead 11262 due to the first length being too small under the condition that the total length of the lead 11262 remains the same. By way of example, a ratio between the first length and the second length may be in a range of 1-12. If the ratio is too small, it is likely to cause the vibration amplitude of the lead 11262 at the support block 11218 to remain relatively large, thereby causing the lead 11262** to break.

In some embodiments, when no excitation signal is input to the speaker 112, the first end **1126*a* and the fixed position 1126*c* at which the lead 11262 is supported by the support block 11218 are in a same reference plane that is perpendicular to the vibration direction of the speaker 112, which is advantageous to reduce the force within the lead 11262, thereby reducing the risk of breakage of the lead 11262**.

By way of example, referring to FIG. 23, the second extension portion 11264 may be secured to the support block 11218 and the above-described pad. For example, the second extension portion 11264 may be soldered to the above-described pad at the second end **1126*b* while the fixed position 1126*c* may be fixed to the support block 11218 by the adhesive 11219. An end of the second extension portion 11264 connected to the first extension portion 11263 may be designated as a starting point of the second extension portion 11264, and a second end 1126*b* may be designated as an ending point of the second extension portion 11264, a position (e.g., the fixed position 1126*c*) at which the second extension portion 11264 is secured to the support block 11218 may be located at a point on the second extension portion 11264 between one-half of a length of the second extension 11264 and three-quarters of the length of the second extension 11264**.

Figure 21:
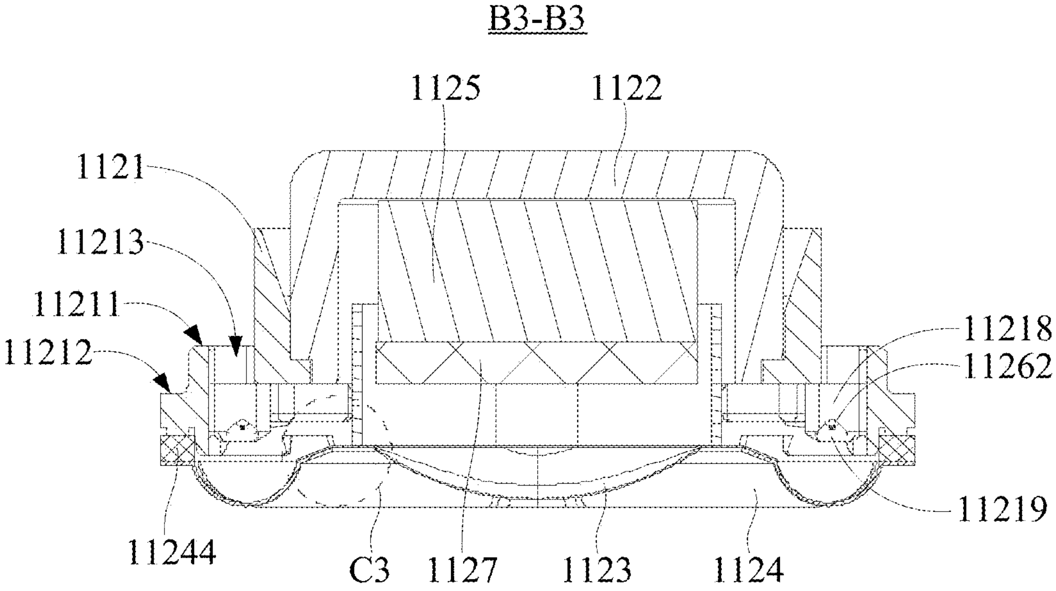
FIG. 21 is a schematic diagram of a cross-sectional structure of the speaker in FIG. 19 along a B3-B3 sectional cutting direction according to some embodiments of the present disclosure.
Figure 22:
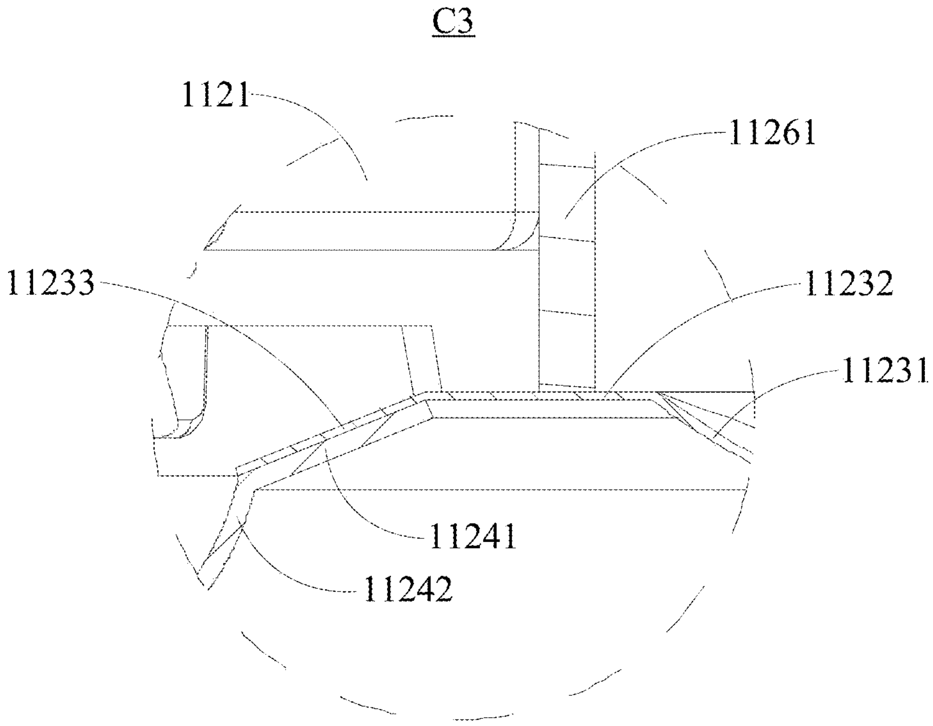
FIG. 22 is an enlarged schematic structural view of the speaker in FIG. 21 in a C3 region according to some embodiments of the present disclosure.

By way of example, referring to FIGS. 19, 21, and 22, the diaphragm 1123 may include a main body portion 11231, a first annular connection portion 11232, and a second annular connection portion 11233 connected by an integrated connection. The first annular connection portion 11232 may be connected to the coil 1126, and the second annular connection portion 11233 may be connected to the folded ring 1124. The main body portion 11231 may be configured as a dome-like structure that is raised in a direction away from the coil 1126. Further, a positive projection of the second annular connection portion 11233 in the vibration direction of the speaker 112 may cover the lead 11262, and the second annular connection portion 11233 may bend relative to the first annular connection portion 11232 in a direction away from the coil 1126, so as to form a distance between the second annular connection portion 11233 and the lead 11262 in the vibration direction of the speaker 112. This is conducive to avoiding unnecessary collision of the lead 11262 with the folded ring 1124 or the diaphragm 1123 connected thereto.

By way of example, referring to FIGS. 19 to 22, the folded ring 1124 may include a third annular connection portion 11241, a pleated portion 11242, and a fourth annular connection portion 11243 connected by an integrated connection. The third annular connection portion 11241 may be connected to a side of the second annular connection portion 11233 that is away from the coil 1126, and the fourth annular connection portion 11243 may be connected to the frame 1121 (e.g., the annular peripheral wall 11214) via a reinforcement member 11244. Further, the pleated portion 11242 may be raised in a direction away from the lead 11262, thereby avoiding unnecessary collisions between the pleated portion 11242 and the lead 11262.

Based on the above related descriptions, the present disclosure provides an electronic device, the electronic device may include a support component and the core module 11. The support component may be connected to the core housing 111 to support the core module 11 to be worn at a wearing position. The support component may be configured as an ear-hanging structure (e.g., the hook-like structure 12) that hangs on the ear in the wearing state, or as a headband structure that wraps around the head in the wearing state. Further, the wearable position may be a position of a cheek of a user near an ear, a position on a front side of the ear, or other physiological parts of the user. Based on this, in addition to the earphone 10, the electronic device may also be a terminal device such as smart glasses including the core module 11. The core module 11 may include, in addition to the speaker 112, a transducer device based on a principle of bone conduction. For example, the electronic device may include a speaker 112, the speaker 112 being configured to generate an air-conducted sound. For the electronic device including the speaker 112, the electronic device may also be a terminal device such as a cell phone, a smartwatch, or the like.

The above descriptions are merely part of the embodiments of the present disclosure and should not be construed as limiting the scope of protection of the present disclosure. Any equivalent devices or processes derived from the content of the present disclosure and the accompanying drawings, or directly or indirectly applied to other related technical fields, shall also be included within the scope of protection of the present disclosure.

What is claimed is:

1. A core module, comprising a core housing, and a speaker and a bracket disposed within the core housing, wherein the bracket and the speaker collectively form an acoustic cavity, the core housing includes an acoustic hole, the bracket includes an acoustic channel, the acoustic hole being in flow communication with the acoustic cavity through the acoustic channel, the speaker includes first accommodation space in flow communication with the acoustic cavity, the speaker, the bracket, and the core housing form second accommodation space that is outside the speaker and isolated from the acoustic cavity, the speaker includes a coil, a frame, and two metal members disposed on the frame, wherein one of the two metal members is configured as a positive terminal of the speaker, and the other one of the two metal members is configured as a negative terminal of the speaker, and each of the two metal members includes a first pad, a second pad, and a transition portion connecting the first pad and the second pad, the first pad and the second pad are exposed from the frame, the first pad is located within the first accommodation space and is connected to the coil, the second pad is located within the second accommodation space, and a distance between the first pads of the two metal members is greater than a distance between the second pads of the two metal members.

2. The core module of claim 1, wherein the transition portion is embedded within the frame, or the transition portion is sealed on the frame in a waterproof manner.

3. The core module of claim 1, wherein the second pads of the two metal members are arranged side by side and spaced apart, one end of each transition portion is connected to a corresponding second pad, the two transition portions respectively extend in directions away from each other, and each first pad is connected to the other end of the corresponding transition portion.

4. The core module of claim 3, wherein the speaker includes a magnetic cover and a magnet disposed within the magnetic cover, the magnet and the magnetic cover form a magnetic gap, the coil extends into the magnetic gap, the frame includes an annular peripheral wall, an annular flange connected to an inner wall surface of the annular peripheral wall, and one or more bosses disposed at a junction of the annular flange and the annular peripheral wall, the magnetic cover is fixed on the annular flange, the one or more bosses support the two metal members, and the second pads are exposed from the one or more bosses.

5. The core module of claim 4, wherein the one or more bosses include two bosses spaced apart along a circumferential direction of the annular peripheral wall, and each of the two bosses is configured to support one of the two metal members.

6. The core module of claim 1, wherein the frame has a long axis direction and a short axis direction that are perpendicular to a vibration direction of the speaker and orthogonal to each other, a dimension of the frame in the long axis direction is greater than a dimension of the frame in the short axis direction, and the two metal members are located at a same end of the long axis direction.

7. The core module of claim 1, wherein the bracket and the core housing cooperate to form a first adhesive reservoir groove surrounding at least a portion of the acoustic hole, and the first adhesive reservoir groove contains a first adhesive for sealing an assembly gap between the bracket and the core housing.

8. The core module of claim 7, wherein the frame includes a first annular platform and a second annular platform arranged in a stepped shape, the second annular platform surrounds a periphery of the first annular platform, a portion of a lower end of the bracket is supported by the first annular platform, and another portion of the lower end of the bracket forms a gap region with the second annular platform, so that the bracket, the frame, and the core housing form a second adhesive reservoir groove, and the second adhesive reservoir groove contains a second adhesive for sealing an assembly gap between any two of the bracket, the frame, and the core housing.

9. The core module of claim 7, wherein the bracket includes an annular main body portion and a docking portion connected to the annular main body portion, the annular main body portion is sleeved on a periphery of the speaker to form the acoustic cavity, the acoustic channel penetrates through the docking portion and the annular main body portion, the docking portion is located between the annular main body portion and the core housing and surrounds at least a portion of the acoustic hole, and the docking portion cooperates with the core housing to form the first adhesive reservoir groove.

10. The core module of claim 9, wherein the docking portion is configured to form a bottom wall and one side wall of the first adhesive reservoir groove, and the core housing forms another side wall of the first adhesive reservoir groove.

11. The core module of claim 9, wherein an inner side of the core housing includes a recessed region, the acoustic hole is located at a bottom of the recessed region, the core module further comprises an acoustic resistance mesh disposed within the recessed region, and the docking portion presses the acoustic resistance mesh against the bottom of the recessed region.

12. The core module of claim 11, wherein the first adhesive is further configured to seal an assembly gap between the bracket and the acoustic resistance mesh and/or an assembly gap between the acoustic resistance mesh and the core housing.

13. An electronic device, comprising a support component and a core module, wherein the support component is connected to a core housing to support the core module and place the core module at a wearing position, and the core module includes the core housing, and a speaker and a bracket disposed within the core housing, wherein the bracket and the speaker collectively form an acoustic cavity, the core housing includes an acoustic hole, the bracket includes an acoustic channel, the acoustic hole being in flow communication with the acoustic cavity through the acoustic channel, the speaker includes first accommodation space in flow communication with the acoustic cavity, the speaker, the bracket, and the core housing form second accommodation space that is outside the speaker and isolated from the acoustic cavity, the speaker includes a coil, a frame, and two metal members disposed on the frame, wherein one of the two metal members is configured as a positive terminal of the speaker, and the other one of the two metal members is configured as a negative terminal of the speaker, and each of the two metal members includes a first pad, a second pad, and a transition portion connecting the first pad and the second pad, the first pad and the second pad are exposed from the frame, the first pad is located within the first accommodation space and is connected to the coil, the second pad is located within the second accommodation space, and a distance between the first pads of the two metal members is greater than a distance between the second pads of the two metal members.

14. The electronic device of claim 13, wherein the transition portion is embedded within the frame, or the transition portion is sealed on the frame in a waterproof manner.

15. The electronic device of claim 13, wherein the second pads of the two metal members are arranged side by side and spaced apart, one end of each transition portion is connected to a corresponding second pad, the two transition portions respectively extend in directions away from each other, and each first pad is connected to the other end of the corresponding transition portion.

16. The electronic device of claim 15, wherein the speaker includes a magnetic cover and a magnet disposed within the magnetic cover, the magnet and the magnetic cover form a magnetic gap, the coil extends into the magnetic gap, the frame includes an annular peripheral wall, an annular flange connected to an inner wall surface of the annular peripheral wall, and one or more bosses disposed at a junction of the annular flange and the annular peripheral wall, the magnetic cover is fixed on the annular flange, the one or more bosses support the two metal members, and the second pads are exposed from the one or more bosses.

17. The electronic device of claim 13, wherein the frame has a long axis direction and a short axis direction that are perpendicular to a vibration direction of the speaker and orthogonal to each other, a dimension of the frame in the long axis direction is greater than a dimension of the frame in the short axis direction, and the two metal members are located at a same end of the long axis direction.

18. The electronic device of claim 13, wherein the bracket and the core housing cooperate to form a first adhesive reservoir groove surrounding at least a portion of the acoustic hole, and the first adhesive reservoir groove contains a first adhesive for sealing an assembly gap between the bracket and the core housing.

19. The electronic device of claim 18, wherein the frame includes a first annular platform and a second annular platform arranged in a stepped shape, the second annular platform surrounds a periphery of the first annular platform, a portion of a lower end of the bracket is supported by the first annular platform, and another portion of the lower end of the bracket forms a gap region with the second annular platform, so that the bracket, the frame, and the core housing form a second adhesive reservoir groove, and the second adhesive reservoir groove contains a second adhesive for sealing an assembly gap between any two of the bracket, the frame, and the core housing.

20. The electronic device of claim 18, wherein the bracket includes an annular main body portion and a docking portion connected to the annular main body portion, the annular main body portion is sleeved on a periphery of the speaker to form the acoustic cavity, the acoustic channel penetrates through the docking portion and the annular main body portion, the docking portion is located between the annular main body portion and the core housing and surrounds at least a portion of the acoustic hole, and the docking portion cooperates with the core housing to form the first adhesive reservoir groove.

* * * * *